United States Patent
Maeda et al.

(10) Patent No.: US 10,895,775 B2
(45) Date of Patent: Jan. 19, 2021

(54) POLARIZING PLATE PROTECTIVE FILM, POLARIZING PLATE, LIQUID CRYSTAL DISPLAY DEVICE, AND PRODUCTION METHOD OF POLARIZING PLATE PROTECTIVE FILM

(71) Applicant: FUJIFILM Corporation, Tokyo (JP)

(72) Inventors: Yoshinori Maeda, Kanagawa (JP); Mikio Nakagawa, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 117 days.

(21) Appl. No.: 15/280,003

(22) Filed: Sep. 29, 2016

(65) Prior Publication Data

US 2017/0090072 A1   Mar. 30, 2017

(30) Foreign Application Priority Data

Sep. 30, 2015  (JP) .................................. 2015-195437

(51) Int. Cl.
*G02F 1/1335* (2006.01)
*G02B 1/14* (2015.01)
*G02B 5/30* (2006.01)

(52) U.S. Cl.
CPC ......... *G02F 1/133528* (2013.01); *G02B 1/14* (2015.01); *G02B 5/3025* (2013.01); *C09K 2323/035* (2020.08)

(58) Field of Classification Search
CPC ... G02B 1/14; G02B 5/3025; G02F 1/133528; Y10T 428/105; C09K 2323/035
USPC ........................................................ 428/1.33
See application file for complete search history.

(56) References Cited

U.S. PATENT DOCUMENTS

| | | | | |
|---|---|---|---|---|
| 2,763,566 A | * | 9/1956 | Van Allen | C07C 251/72 252/589 |
| 2005/0234231 A1 | * | 10/2005 | Hashimoto | C08B 3/16 536/58 |
| 2008/0118668 A1 | * | 5/2008 | Sasata | C08J 5/18 428/1.1 |
| 2012/0103398 A1 | * | 5/2012 | Kanou | C08J 7/12 136/251 |
| 2014/0116292 A1 | * | 5/2014 | Kim | C08K 5/16 106/170.1 |
| 2014/0116293 A1 | * | 5/2014 | Kim | C08K 5/16 106/170.11 |
| 2014/0356629 A1 | * | 12/2014 | Kato | C09D 167/02 428/413 |
| 2015/0053113 A1 | * | 2/2015 | Kim | C08K 5/45 106/170.43 |
| 2015/0361036 A1 | | 12/2015 | Inada et al. | |

FOREIGN PATENT DOCUMENTS

| | | | | |
|---|---|---|---|---|
| JP | H05-194789 | A | | 8/1993 |
| JP | 2002-303722 | A | | 10/2002 |
| JP | 2005-272566 | A | | 10/2005 |
| JP | 2005272566 | A | * | 10/2005 |
| JP | 2006-317813 | A | | 11/2006 |
| WO | WO-2012030117 | A3 | * 5/2012 | ................ C08J 5/18 |
| WO | WO-2012177043 | A2 | * 12/2012 | ................ C08K 5/16 |
| WO | 2014/133041 | A1 | | 9/2014 |

OTHER PUBLICATIONS

James M. Reilly; IPI Storage Guide for Acetate Film; 1993; pp. 1-24; Image Permanence Institute; Rochester NY.
Notification of Reasons for Refusal issued by the Japanese Patent Office dated May 29, 2018, in connection with Japanese Patent Application No. 2015-195437.
Journal of Technical Disclosure, JIII No. 2001-1745 dated Mar. 15, 2001 which corresponds to JIII Journal of Technical Disclosure, No. 2001-1745 which is cited on p. 9 line 10 of the English Specification filed on Sep. 29, 2016.

* cited by examiner

*Primary Examiner* — Sophie Hon
(74) *Attorney, Agent, or Firm* — Edwards Neils LLC; Jean C. Edwards, Esq.

(57) ABSTRACT

The invention is directed to a polarizing plate protective film containing a polymer having at least one of an ester bond and an amide bond and a compound which generates a base by an action of an acid, a polarizing plate including the polarizing plate protective film and a polarizer, a liquid crystal display device including a liquid crystal cell and the polarizing plate, and a production method of a polarizing plate protective film including producing the Polarizing plate protective film with a composition containing a polymer having at least one of an ester bond and an amide bond and a compound which generates a base by an action of an acid.

11 Claims, No Drawings

POLARIZING PLATE PROTECTIVE FILM, POLARIZING PLATE, LIQUID CRYSTAL DISPLAY DEVICE, AND PRODUCTION METHOD OF POLARIZING PLATE PROTECTIVE FILM

CROSS-REFERENCE TO RELATED APPLICATIONS

This application claims the benefit of Japanese Patent Application JP 2015-195437, filed Sep. 30, 2015, the entire content of which is hereby incorporated by reference, the same as if set forth at length.

FIELD OF THE INVENTION

The present invention relates to a protective film which is used in a polarizing plate, and more particularly, to a polarizing plate protective film which can realize the prevention of degradation of the film and the enhancement of durability of polarizer. The invention also relates to a production method of the polarizing plate protective film described above, a polarizing plate having the optical film described above, and a liquid crystal display device.

BACKGROUND OF THE INVENTION

In general, the polarizing plate includes a polarizer and a polarizing plate protective film. As the polarizing plate protective film, polymer film having an ester bond which is produced by using as a material, a (meth) acrylic resin, polyethylene terephthalate (PET), cellulose acylate or the like or a polymer film having an amide bond which is produced by using as a material, polyamide, polyaramide or the like can be used. It is known that these polymer films are hydrolyzed particularly in high temperature and high humidity environment to change the optical properties and mechanical strength of the film, thereby degrading the performance.

In J. M. Reilly, "IPI Storage Guide for Acetate Film", Image permanence institute, USA, 1993, there is described that the cellulose acetate hydrolyzes to generate acetic acid in the film and the hydrolysis is further accelerated due to the autocatalytic action.

In JP-A-5-194789 (the term "SF-A" as used herein means an "unexamined published Japanese patent application"), as a method for preventing the hydrolysis of cellulose acetate and preventing the degradation of cellulose acetate film, a method of adding, an amine compound in which pKa of the conjugated acid (negative logarithm, of acid dissociation constant) is 4 or more is disclosed.

Moreover, polyvinyl alcohol (PVA) dyed with iodine is often used as a polarizer of polarizing plate and it is known that the polarization degree is deteriorated particularly under high temperature and high humidity circumstances.

SUMMARY OF THE INVENTION

However, when the amine compound which is a basic substance is added to a polarizing plate protective film in accordance with the method described in JP-A-5-194789, since the acid generated by the hydrolysis is neutralized, the autocatalytic action of the acid is suppressed so that the degradation of optical properties or the like of the polarizing plate protective film, can be prevented, but a problem arises in that the polarization degree of the polarizing plate is notably deteriorated. The reason for this is estimated that since the polyvinyl alcohol contained in the polarizer is crosslinked with an acidic substance, for example, boric acid, when the boric acid or the like is neutralized with the basic substance in the polarizing plate protective film to be consumed, the iodine is apt to diffuse from the polyvinyl alcohol As described above, when an acid is generated in the polarizing plate protective film, the optical properties and mechanical strength of the polarizing plate protective film is degraded by the hydrolysis, and in order to prevent this problem, when the basic substance is incorporated into the polarizing plate protective film, the polarization degree of the polarizing plate is deteriorated.

The invention has been made in view of the situation described above, and an object of the invention is to provide a polarizing plate protective film which is hard to generate the degradation of performance due to hydrolysis even in high temperature and high humidity environment and which can suppress the deterioration of polarization degree when it is stuck to a polarizer to produce a polarizing plate, a polarizing plate and a liquid crystal display device each containing the polarizing plate protective film described above, and a production method of the polarizing plate protective film described above.

As a result of intensive investigations, the inventors have found that the hydrolysis of the polymer in the polarizing plate protective film is suppressed even in high temperature and high humidity environment and the deterioration of polarization degree of the polarizer can be suppressed by using a compound which generates a base by the action of an acid.

Specifically, the object described above can be achieved by the constitutions described below.

[1]

A polarizing plate protective film containing a polymer having at least one of an ester bond and an amide bond and a compound which generates a base by an action of an acid.

[2]

The polarizing plate protective film as described in [1], wherein the polymer is at least one selected from a (meth) acrylic resin and cellulose acylate.

[5]

The polarizing plate protective film as described in [1] or [2], wherein the polymer is cellulose acylate.

[4]

The polarizing plate protective film as described in [3], wherein an acyl substitution degree of the cellulose acylate is from 1.8 to 3.0.

[5]

The polarizing plate protective film as described in any one of [1] to [4], wherein the compound which generates a base by an action of an acid is at least one selected from an oxime compound, a hydrazone compound, an alkyloxycarbonyl protected amine and an aryloxycarbonyl protected amine.

[6]

The polarizing plate protective film as described in any one of [1] to [5], wherein the compound which generates a base by an action of an acid is at least one selected from a compound represented by formula (1) shown below, a compound represented by formula (2) shown below and a compound represented by formula (3) shown below:

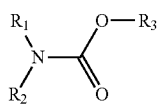

Formula (1)

in formula (1), $R_1$ and $R_2$ each independently represents a hydrogen atom, an alkyl group or an aryl group, $R_3$ represents an alkyl group or an aryl group, provided that at least one of $R_1$ and $R_2$ represents an alkyl group or an aryl group, or $R_1$ and $R_2$ may be combined with each other to form a ring;

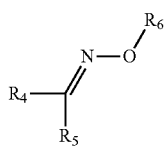

Formula (2)

in formula (2), $R_4$ and $R_5$ each independently represents a hydrogen atom, an alkyl group or an aryl group, $R_5$ represents a hydrogen atom, an alkyl group, an aryl group, an acyl group or a group represented by formula (N1) shown below, provided that at least one of $R_4$ and $R_5$ represents an alkyl group or an aryl group, or $R_4$ and $R_5$ may be combined with each other to form a ring;

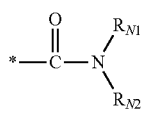

Formula (N1)

in formula (N1), $R_{N1}$ and $R_{N2}$ each independently represents a hydrogen atom, an alkyl group or an aryl group, * represents a bond connecting to the oxygen atom, or $R_{N1}$ and $R_{N2}$ may be combined with each other to form a ring;

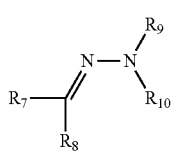

Formula (3)

in formula (3), $R_7$ to $R_{10}$ each independently represents a hydrogen atom, an alkyl group or an aryl group, provided that at least one of $R_7$ and $R_8$ represents an alkyl group or an aryl group and at least one of $R_9$ and $R_{10}$ represents an alkyl group or an aryl group, or $R_7$ and $R_8$ may be combined with each other to form a ring, or $R_9$ and $R_{10}$ may be combined with each other to form a ring.

[7]

The polarizing plate protective film as described in any one of [1] to [6], which further contains a compound represented by formula (4) shown below:

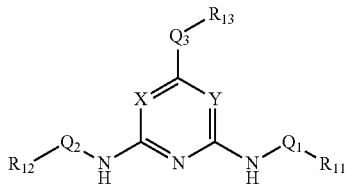

Formula (4)

in formula. (4), X and Y each independently represents— N— or —CH—, $Q_1$, $Q_2$ and $Q_3$ each independently represents a single bond or a divalent connecting group, and $R_{11}$, $R_{12}$ and $R_{13}$ each independently represents a hydrogen atom, an alkyl group, an alkenyl group, an alkynyl group, an aryl group, a cyano group a halogen atom or a heterocyclic group.

[8]

The polarizing plate protective film as described in any one of [1] to [7], wherein at temperature of 25° C. and relative humidity of 60%, a retardation value in an in-plane direction at a wavelength of 550 nm is from −20 to 120 nm and a retardation value in a thickness direction at a wavelength of 550 nm is from −70 to 300 nm.

[9]

The polarizing plate protective film as described in any one of [1] to [8], wherein at temperature of 25° C. and relative humidity of 60%, a retardation value in an in-plane direction at a wavelength of 550 nm is from 20 to 80 nm and a retardation value in a thickness direction at a wavelength of 550 nm is from 80 to 300 nm.

[10]

A polarizing plate containing the polarizing plate protective film as described in any one of [1] to [9] and a polarizer.

[11]

A liquid crystal display device having a liquid crystal cell and the polarizing plate as described in [10].

[12]

The liquid crystal display device as described in [11], wherein a display system is a VA system or an IPS system.

[13]

A production method of a polarizing plate protective film comprising producing the polarizing plate protective film by using a composition containing a polymer having at least one of an ester bond and an amide bond and a compound which generates a base by an action of an acid.

[14]

A production method of a polarizing plate protective film having a core layer and a skin layer, which includes a step of co-casting a dope for forming a core layer containing cellulose acylate and a dope for forming a skin layer containing cellulose acylate, wherein at least any one of the dope for forming a core layer and the dope for forming a skin layer contains a compound which generates a base by an action of an acid.

According to the invention, a polarizing plate protective film which is hard to generate the degradation of performance due to hydrolysis even in high temperature and high humidity environment and which can suppress the deterioration of polarization degree when it is stuck to a polarizer to produce a polarizing plate, a polarizing plate and a liquid crystal display device each containing the polarizing plate protective film described above, and a production method of the polarizing plate protective film described above can be provided.

DETAILED DESCRIPTION OF THE INVENTION

The invention will be described in detail below. The description of the constituent element below is made based on the typical embodiment of the invention in some cases, but the invention should not be construed as being limited thereto. In the specification, a numerical value range represented by using the term "to" means a range which includes the numerical values described before and after the term "to" as a lower limit and an upper limit, respectively. The term "(meth)acrylate" represents at least one of acrylate and methacrylate, the term "(meth)acryl" represents at least one of acryl and methacryl, and the term "(meth)acryloyl" represents at least one of acryloyl and methacryloyl.

[Polarizing Plate Protective Film]

The polarizing plate protective film of the invention is a polarizing plate protective film containing a polymer having at least one of an ester bond and an amide bond and a compound which generates a base by the action of an acid.

[Polymer having at least one of Ester Bond and Amide Bond]

The polymer having at least one of an ester bond and an amide bond includes, for example, a (meth)acrylic resin, a cellulose ester, a polyester, a polyamide and a polycarbonate. Among them, at least one selected from a (meth)acrylic resin, polyethylene terephthalate and cellulose acylate is preferred, and cellulose acylate is more preferred.

The cellulose acylate is an ester of cellulose and a carboxylic acid. The carboxylic acid is preferably a fatty acid having from 2 to 22 carbon atoms. A cellulose acylate composed of a lower fatty acid having from 2 to 4 carbon atoms is more preferred, and cellulose acetate having 2 carbon atoms is most preferred.

Examples of the cellulose which is a raw material of the cellulose acylate include cotton linter and wood pulp (broadleaf tree pulp or coniferous tree pulp). Cellulose acylates obtained from any raw celluloses can be used, and the raw celluloses may be used as a mixture thereof in some cases. These raw celluloses are described in detail, for example, in Plastic Zairyo Koza (17), Senni-kei Jushi (Plastic Material Lecture (17), Fiber-Based Resin), written by Marusawa and Uda, published by Nikkan Kogyo Shinbun, Ltd. (1970) and JIII Journal of Technical Disclosure, No. 2001-1745, pages 7 to 8, and the celluloses described therein can be used and are not particularly limited in the application thereof to the cellulose acylate film of the invention.

The cellulose acylate is a cellulose whose hydroxyl group is substituted with an acyl group, and a number of carbon atoms of the acyl group is preferably from 2 to 22. The acyl group having from 2 to 20 carbon atoms is not particularly limited and may be an aliphatic group or an aryl group or may be a single acyl group or a mixture of two or more acyl groups. Examples thereof include an alkylcarbonyl ester of cellulose, an alkenylcarbonyl ester of cellulose, an aromatic carbonyl ester of cellulose and an aromatic alkylcarbonyl ester of cellulose, and these esters may have a substituent. Preferred examples of the acyl group include an acetyl group, a propionyl group, a butanoyl group, a heptanoyl group, a hexanoyl group, an octanoyl group, a decanoyl group, a dodecanoyl group, a tridecanoyl group, a tetradecanoyl group, a hexadedanoyl group, an octadecanoyl group, an isobutanoyl group, a tert-butanoyl group, a cyclohexanecarbonyl group, an oleoyl group, a benzoyl group, a naphthylcarbonyl group and a cinnamoyl group. Of these groups, an acetyl group, a propionyl group, a butanoyl group, a dodecanoyl group, an octadecanoyl group, a tert-butancyl group, an oleoyl group, a benzoyl group, a naphthylcarbonyl group, a cinnamoyl group and the like are preferred, an acetyl group, a propionyl group and a butanoyl group are more preferred, an acetyl group and a propionyl group are still more preferred, and an acetyl group is most preferred.

The polymerization degree of the cellulose acylate is preferably from 180 to 700 in terms of a viscosiay average polymerization degree, and in the case of cellulose acetate, more preferably from 180 to 550, still more preferably from 180 to 400, and particularly preferably from 180 to 350. The viosity average polymerization degree can be measured according to the intrinsic viscosity method by Uda, et al. (Kazuo Uda and Hideo Saito, Journal of the Society of Fiber Science and Technology, Japan, Vol. 18, No. 1, pages 105 to 120 (1962)). This method is also described in detail in JP-A-9-95538.

The molecular weight distribution of the cellulose acylate is evaluated by gel permeation chromatography (GPC-8020 (trade name) produced by Tohso Corp.) using N-methylpyrrolidone as a solvent, and it is preferred that the polydispersity index Mw/Mn (Mw is a weight average molecular weight and Mn is a number average molecular weight) is small and the molecular weight distribution is narrow. Specifically, the Mw/Mn value is preferably from 1.0 to 4.0, more preferably from 2.0 to 4.0, and most preferably from 2.3 to 3.4.

(Acyl Substitution Degree of Cellulose Acylate)

The cellulose acylate is a cellulose whose hydroxyl group is acylated, and as to the measurement of the substitution degree of acyl group to the hydroxyl group of cellulose, the bonding degree of an acetic acid and/or a fatty acid having from 3 to 22 carbon atoms substituted on the hydroxyl group of cellulose is measured and the substitution degree can be obtained by calculation. As to the measuring method, the measurement can be performed in accordance with ASTM D-817-91.

In the case where the polymer contained in the polarizing plate protective film of the invention is cellulose acylate, an average acyl substitution degree of the cellulose acylate is preferably from 1.8 to 3.0, more preferably from 2.0 to 2.9, and still more preferably from 2.3 to 2.9.

<(Meth)acrylic resin>

The (meth)acrylic resin may be any of an acrylic resin, a methacrylic resin, may be a copolymer of an acrylic resin and a methacrylic resin, and may further contain other structural units.

The (meth)acrylic resin preferably contains a structural unit derived from methyl methacrylate, and it may or may not contain a structural unit derived from an alkyl(meth) acrylate other than methyl methacrylate.

The alkyl(meth)acrylate other than methyl methacrylate includes, for example, an acrylate (preferably an alkyl acrylate in which a number of the carbon atoms in the alkyl group is from 1 to 18), for example, methyl acrylate, ethyl acrylate, n-butyl acrylate, isobutyl acrylate, tert-butyl acrylate, cyclohexyl acrylate or benzyl acrylate; and a methacrylate (preferably an alkyl methacrylate in which a number of the carbon atoms in the alkyl group is from 2 to 18), for example, ethyl methacrylate, propyl methacrylate, n-butyl methacrylate, isobutyl methacrylate, tert-butyl methacrylate, cyclohexyl methacrylate or benzyl methacrylate. The alkyl acrylates other than methyl methacrylate may be used one kind alone or may be used two or more kinds thereof in combination.

The (meth)acrylic resin may contain a structural unit other than those described above. The structural unit other than those described above include, for example, an α,β-unsaturated acid, for example, acrylic acid or methacrylic acid, an unsaturated group containing divalent carboxylic acid, for example, maleic acid, fumaric, acid or itaconic acid, an aromatic vinyl compound, for example, styrene or of methylstyrene, an α,β-unsaturated nitrile, for example, acrylonitrile or methacrylonitrile, maleic anhydride, maleimide, N-substituted maleimide, and glutaric anhydride. The structural units may be introduced one kind alone or two or more kinds in combination into the (meth)acrylic resin.

The weight average molecular weight of the (meth)acrylic resin is not particularly limited and is preferably from 150,000 to 2,000,000, more preferably from 300,000 to 2,000,000, and still more preferably from 300,000 to 500,000. The weight average molecular weight (Mw) of the (meth)acrylic resin is a weight average molecular weight measured by GPC (gel permeation chromatography).

When the weight average molecular weight of the (meth) acrylic resin is 150,000 or more, heat resistance and mechanical properties are excellent, and when it is 2,000,000 or less, the peelability from a metal support and drying property of organic solvent are excellent. When the weight average molecular weight is 300,000 or more, the heat resistance and the mechanical properties are more excellent, and when it is 500,000 or less, the peelability from a metal support and the drying property of organic solvent are more excellent.

The weight average molecular weight of the (meth)acrylic resin can be measured by GPC. The measurement conditions are those as shown below.
Solvent: Methylene chloride
Column: Shodex K806, K805, K803G (produced by Showa Denko K. K., Three columns are connected to use)
Column temperature: 25° C.
Sample concentration: 0.1% by weight
Detector: RI Model 504 (produced by GL Sciences Inc.)
Pump: L6000 (produced by Hitachi Ltd.)
Flow rate: 1.0 ml/min
Calibration curve: A calibration curve based on 13 samples of standard standard polystyrene (produced by Tosoh Corp.) having Mw ranging from 500 to 2,800,000 is used. The 13 samples were preferably employed at nearly equal intervals.

The content of the polymer having at least one of an ester bond and an amide bond in the polarizing plate protective film of the invention is preferably 50% by weight or more and less than 100% by weight, more preferably 65% by weight or more and less than 100% by weight, still more preferably 80% by weight or more and less than 100% by weight, with respect to the total weight of the polarizing plate protective film.

[Compound which Generates Base by Action of Acid]

The compound which generates a base by the action of an acid (also referred to as a "base generator") contained in the polarizing plate protective film of the invention is a compound which does not have basicity itself and whose decomposition is accelerated in the presence of a tiny amount of acid to generate a base.

The mechanism for achieving the effects of the invention by the base generator described above is estimated as follows. The polarizing plate protective film of the invention contains a polymer having at least one of an ester bond and an amide bond, and the ester bond and/or the amide bond are hydrolyzed in high temperature and high humidity environment to generate a carboxylic acid. On the other hand, the base generator contained in the polarizing plate protective film of the invention is accelerated to decompose by the carboxylic acid described above, thereby releasing a tiny amount of base. It is believed that as a result, since the base neutralize the carboxylic acid, the degradation of performance of the polarizing plate protective film can be suppressed. It is also believed that since the base generator per se does not behave as a base substance, the deterioration of polarization degree of the polarizer can be suppressed.

The base generator is not particularly limited, and is preferably at least one selected from an oxime compound, a hydrazone compound, a an alkyloxycarbonyl compound and an aryloxycarbonyl compound, more preferably at least one selected from a compound represented by formula (1) shown below, a compound represented by formula (2) shown below and a compound represented by formula (3) shown below.

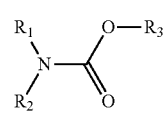

Formula (1)

In formula (1), $R_1$ and $R_2$ each independently represents a hydrogen atom, an alkyl group or an aryl group, $R_3$ represents an alkyl group or an aryl group, provided that, at least one of $R_1$ and $R_2$ represents an alkyl group or an aryl group. $R_1$ and $R_2$ may be combined with each other to form a ring.

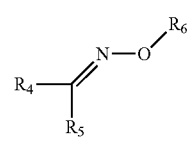

Formula (2)

In formula (2), $R_4$ and $R_5$ each independently represents a hydrogen atom, an alkyl group or an aryl group, $R_6$ represents a hydrogen atom, an alkyl group, an aryl group, an acyl group or a group represented by formula (N1) shown below, provided that at least one of $R_4$ and $R_5$ represents an alkyl group or an aryl group. $R_4$ and $R_5$ may be combined with each other to form a ring.

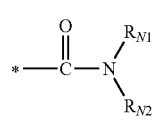

Formula (N1)

In formula (N1), $R_{N1}$ and $R_{N2}$ each independently represents a hydrogen atom, an alkyl group or an aryl group. * represents a bond connecting to the oxygen atom. $R_{N1}$ and $R_{N2}$ may be combined with each other to form a ring.

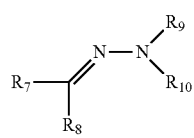

Formula (3)

In formula (3), $R_7$ to $R_{10}$ each independently represents a hydrogen atom, an alkyl group or an aryl group, provided that at least one of $R_7$ and $R_8$ represents an alkyl group or an aryl group and at least one of $R_9$ and $R_{10}$ represents an alkyl group or an aryl group. $R_7$ and $R_8$ may be combined with each other to form a ring. $R_9$ and $R_{10}$ may be combined with each other to form a ring.

In formula (1), $R_1$ and $R_2$ each independently represents a hydrogen atom, an alkyl group or an aryl group, and each is preferably a hydrogen atom or an alkyl group.

In the case where each of $R_1$ and $R_2$ represents the alkyl group, an alkyl group having from 2 to 20 carbon atoms is preferred, and an alkyl group having from 2 to 15 carbon atoms is more preferred.

In the case where each of $R_1$ and $R_2$ represents the aryl group, an aryl group having from 5 to 20 carbon atoms is preferred, and an aryl group having from 5 to 15 carbon atoms is more preferred.

$R_1$ and $R_2$ may be combined with each other to form a ring. The ring formed is preferably a ring having from 5 to 7 carbon atoms and includes, for example a piperidine ring.

In formula (1), $R_3$ represents an alkyl group or an aryl group, and preferred examples thereof are same as in $R_1$ and $R_2$.

In formula (2), $R_4$ and $R_5$ each independently represents a hydrogen atom, an alkyl group or an aryl group, and preferred examples thereof are same as in $R_1$ and $R_2$.

$R_4$ and $R_5$ may be combined with each other to form a ring, and the ring formed is preferably a ring having from 5 to 7 carbon atoms and includes, for example a cyclohexane ring and a benzene ring.

In formula (2), $R_6$ represents a hydrogen atom, an alkyl group, an aryl group, an acyl group or a group represented by formula (N1).

In the case where $R_5$ represents, the alkyl group or aryl group, preferred examples of the alkyl group or aryl group are same as those in $R_1$ and $R_2$.

In the case where $R_6$ represents the acyl group, preferred examples of the acyl group are groups in which a carbonyl group is connected to the preferred examples of the alkyl group and aryl group described above.

In the case where $R_5$ represents the amide group having a substituent, a number of carbon atoms preferably from 2 to 30, and more preferably from 2 to 20.

In formula (N1), $R_{N1}$ and $R_{N2}$ each independently represents a hydrogen atom, an alkyl group or an aryl group. In the case where each of $R_{N1}$ and $R_{N2}$ represents the alkyl group, an alkyl group having from 1 to 20 carbon atoms is preferred, and an alkyl group having from 1 to 15 carbon atoms is more preferred. In the case where each of $R_{N1}$ and $R_{N2}$ represents the aryl group, an aryl group having from 5 to 20 carbon atoms is preferred, and an aryl group having from 5 to 15 carbon atoms is more preferred. $R_{N1}$ and $R_{N2}$ may be combined with each other to form a ring, and the ring formed is preferably a ring having from 5 to 7 carbon atoms and includes, for example a piperidine ring.

In formula (3), $R_7$ to $R_{10}$ each independently represents a hydrogen atom, an alkyl group or an aryl group, and preferred examples thereof are same as in $R_1$ and $R_2$. $R_7$ and $R_8$ may be combined with each other to form a ring, and also $R_9$ and $R_{10}$ may be combined with each other to form a ring. The ring formed is same as the ring in the case where $R_4$ and $R_5$ are combined with each other to form a ring.

In formulae (1) to (3), $R_1$ to $R_{10}$ and the ring formed therefrom may have a substituent. Specific examples of the substituent include an alkyl group, an aryl group, a hydroxyl group, an acyl group, an alkyl ether group, an aminocarbonyl group, an amino group (group represented by —N=CR$^{21}$R$^{22}$, wherein R$^{21}$ and R$^{22}$ each independently represents an alkyl group or an aryl group) and a group formed by combining two or more of these groups.

The molecular weight of the base generator is preferably from 100 to 2,000, more preferably from 200 to 1,200, still more preferably from 300 to 800, from the standpoint of excellent volatilization suppression and obtaining a film having high transparency.

In order to incorporate the base generator into the film in the state where the base generator does not sustained release a base, it is preferred to suppress the generation of base due to absorption of energy based on an external light. Specifically, when the base material is dissolved in a good solvent, for example, dichloromethane, the maximum value of absorption is preferably less than 300 nm, and more preferably less than 280 nm. When the maximum value of absorption is less than 300 nm, the base generation reaction due to the external light is hard to proceed so that the decrease in the remaining amount of the base generator in the polarizing plate protective film can be suppressed.

The pKa of the conjugated acid of the base generated from the base generator is preferably less than 4, more preferably less than 3, still more preferably less than 2, from the standpoint of the suppression of the deterioration of polarization degree of the polarizing, plate. The pKa can be measured according to known methods. For example, it can be measured by a titration method using a mixed solvent of THF (tetrahydrofuran)/water=1/1 (weight ratio) at room temperature.

The content of the base generator in the polarizing plate protective film of the invention is preferably 0.01 part by weight or more and less than 2 parts by weight, more preferably 0.05 parts by weight or more and less than 1 part by weight, still more preferably 0.05 parts by weight or more and less than 0.5 parts by weight, with respect to 100 parts by weight of the polymer having at least one of an ester bond and an amide bond.

[Compound Represented by Formula (4)]

It is preferred that the polarizing plate protective film of the invention further contains a compound represented by formula (4) shown below. By incorporating the compound represented by formula (4) into the polarizing plate protective film, the humidity resistance can be further improved.

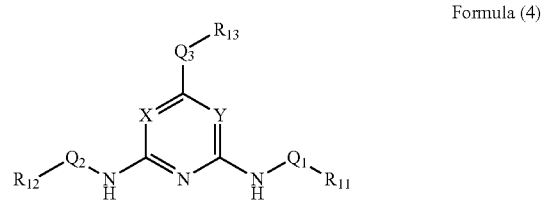

Formula (4)

In formula (4), X and Y each independently represents—N— or —CH—. $Q_1$, $Q_2$ and $Q_3$ each independently represents a single bond or a divalent connecting group. $R_{11}$, $R_{12}$ and $R_{13}$ each independently represents a hydrogen atom, an alkyl group, an alkenyl group, an alkynyl group, an aryl group, a cyano group a halogen atom or a heterocyclic group.

In the case where any one of $Q_1$, $Q_2$ and $Q_3$ represents the divalent connecting group, specific examples of the divalent connecting group includes —$CH_2$—, —CO—, —C(=O))—*, —O— and a group formed by combining these groups. * represents a connecting site to $R_{11}$, $R_{12}$ or $R_{13}$ or a connecting cite of (not NH side but) $R_{11}$ side, $R_{12}$ side or $R_{13}$ side.

In the case where each of $R_{11}$, $R_{12}$ and $R_{13}$ represents the alkyl group, the alkyl group preferably has from 1 to 20 carbon atoms, more preferably has from 1 to 8 carbon atoms, and particularly preferably has from 1 to 4 carbon atoms. In the case where each of $R_{11}$, $R_{12}$ and $R_{13}$ represents the alkyl group, one carbon atom or non-adjacent two or more carbon atoms of the alkyl group may be replaced by a hetero atom selected from an oxygen atom, a sulfur atom and a nitrogen atom (including —NH— and —N(R)— (wherein R represents an alkyl group having from 1 to 8 carbon atoms)). For example, $R_{11}$, $R_{12}$ and $R_{13}$ each may be an alkylene (for example, ethylene or propylene) oxy group.

In the case where each of $R_{11}$, $R_{12}$ and $R_{13}$ represents the alkenyl group, the alkenyl group preferably has from 2 to 20 carbon atoms, more preferably has from 2 to 8 carbon atoms, and particularly preferably has from 2 to 4 carbon atoms.

In the case where each of $R_{11}$, $R_{12}$ and $R_{13}$ represents the alkynyl group, the alkynyl group preferably has from 2 to 20 carbon atoms, more preferably has from 2 to 8 carbon atoms, and particularly preferably has from 2 to 4 carbon atoms.

In the case where each of $R_{11}$, $R_{12}$ and $R_{13}$ represents the aryl group, the aryl group preferably has from 6 to 24 carbon atoms, more preferably has from 6 to 18 carbon atoms, and particularly preferably has from 6 to 10 carbon atoms, from the standpoint of improvement in the humidity dependency. Specifically, the aryl group is preferably a phenyl group, a 1-naphthyl group or a 2-naphthyl group, and particularly preferably a phenyl group.

In the case where each of $R_{11}$, $R_{12}$ and $R_{13}$ represents the halogen atom, the halogen atom is preferably a fluorine atom, a chlorine atom, a bromine atom or an iodine atom.

In the case where each of $R_{11}$, $R_{12}$ and $R_{13}$ represents the heterocyclic group, the heterocyclic group preferably has from 4 to 20 carbon atoms, more preferably has from 4 to 10 carbon atoms, and particularly preferably has from 4 to 6 carbon atoms, from the standpoint of improvement in the humidity dependency. Specifically, the heterocyclic group includes, for example, a pyrrolyl group, a pyrrolidino group, a pyrazolyl group, a pyrazolidino group, an imidazolyl group, a piperazino group and a morpholino group.

$R_{11}$, $R_{12}$ and $R_{13}$ may be combined with each other to form a ring. The ring formed may be a hydrocarbon ring or a heterocyclic ring. The ring formed is preferably a 5-membered ring or a 6-membered ring.

Each of $R_{11}$, $R_{12}$ and $R_{13}$ may further has one or more substituents, if possible, or may not have a substituent. Examples of the substituent which each of $R_{11}$, $R_{12}$ and $R_{13}$ may have include Substituent group T described below.

Substituent Group T:

An alkyl group (preferably having from 1 to 20 carbon atoms, more preferably having from 1 to 12 carbon atoms, particularly preferably having from 1 to 8 carbon atoms, and including, for example, a methyl group, an ethyl group, an isopropyl group, a tert-butyl group, an n-octyl group, an h-decyl group, an n-hexadecyl group, a cyclopropyl group, a cyclopentyl group or a cyclohexyl group), an alkenyl group (preferably having from 2 to 20 carbon atoms, more preferably having from 2 to 12 carbon, atoms, particularly preferably having from 2 to 8 carbon atoms, and including, for example, a vinyl group, an allyl group, a 2-butenyl group or a 3-pentenyl group), an alkynyl group (preferably having from 2 to 20 carbon atoms, more preferably having from 2 to 12 carbon atoms, particularly preferably having from 2 to 8 carbon atoms, and including, for example, a propargyl group or a 3-pentynyl group), an aryl group (preferably having from 6 to 30 carbon atoms, more preferably having from 6 to 20 carbon atoms, particularly preferably having from 6 to 12 carbon atoms, and including, for example, a phenyl group, a biphenyl group or a naphthyl group), an amino group (preferably having from 0 to 20 carbon atoms, more preferably having from 0 to 10 carbon atoms, particularly having from 0 to 6 carbon atoms, and including, for example, an amino group, a methylamino group, a dimethylamino group, a diethylamino group or a dibenzylamino group), an alkoxy group (preferably having from 1 to 20 carbon atoms, more preferably having from 1 to 12 carbon atoms, particularly preferably having from 1 to 8 carbon atoms, and including, for example, a methoxy group, an ethoxy group or a butoxy group), an aryloxy group (preferably having from 6 to 20 carbon atoms, more preferably having from 6 to 16 carbon atoms, particularly preferably having from 6 to 12 carbon atoms, and including, for example, a phenyl oxy group or a 2-naphthyl oxy group), an acyl group (preferably having from 1 to 20 carbon atoms, more preferably having from 1 to 16 carbon atoms, particularly preferably having from 1 to 12 carbon atoms, and including, for example, an acetyl group, a benzoyl group, a formyl group or a pivaloyl group), an alkoxycarbonyl group (preferably having from 2 to 20 carbon atoms, more preferably having from 2 to 16 carbon atoms, particularly preferably having from 2 to 12 carbon atoms, and including, for example, a methoxycarbonyl group or an ethoxybarbonyl group), an aryloxycarbonyl group (preferably having from 7 to 20 carbon atoms, more preferably having from 7 to 16 carbon atoms, particularly preferably having from 7 to 10 carbon atoms, and including, for example, a phenyloxycarbonyl group), an acyloxy group (preferably having from 2 to 20 carbon atoms, more preferably having from 2 to 16 carbon atoms, particularly preferably having from 2 to 10 carbon atoms, and including, for example, an acetoxy group or a benzoyloxy group), an acylamino group (preferably having from 2 to 20 carbon atoms, more preferably having from 2 to 16 carbon atoms, particularly preferably having from 2 to 10 carbon atoms, and including, for example, an acetylamino group or a benzoylamino group), an alkoxycarbonylamino group (preferably having from 2 to 20 carbon atoms, more preferably having from 2 to 16 carbon atoms, particularly preferably having from 2 to 12 carbon atoms, and including, for example, a methoxycarbonylamino group), an aryloxycarbonylamino group (preferably having from 7 to 20 carbon atoms, more preferably group having from 7 to 16 carbon atoms, particularly preferably having from 7 to 12 carbon atoms, and including, for example, phenyloxycarbonylamino group), a sulfonylamino group (preferably having from 1 to 20 carbon atoms, more preferably having from 1 to 16 carbon atoms, particularly preferably having from 1 to 12 carbon atoms, and including, for example, a methanesulfonylamino group or a benzenesulfonamido group), a sulfamoyl group (preferably having from 0 to 20 carbon atoms, more preferably having from 0 to 16 carbon atoms, particularly preferably having from 0 to 12 carbon atoms, and including, for example, a sulfamoyl group, a methytsulfamoyl group, a dimetalfamoyl group or a phenylsulfamoyl group), a carbamoyl group (preferably having from 1 to 20 carbon atoms, more preferably having from 1 to 16 carbon atoms, particularly preferably having from 1 to 12 carbon atoms, and including, for example, a carbamoyl group, a methylcarbamoyl group, a diethylcarbamoyl group or a phenylcarbamoyl group), an alkylthio group (preferably having from 1 to 20 carbon atoms, more preferably having from 1 to 16 carbon atoms, particularly preferably having from 1 to 12 carbon atoms, and including, for example, a methylthio group or an ethylthio group), an arylthio group (preferably having from 6 to 20 carbon atoms, more preferably having from 6 to 16 carbon atoms, particularly preferably having from 6 to 12 carbon atoms, and including, for example, a phenylthio group), a sulfonyl group (preferably having from 1 to 20 carbon atoms, more preferably having from 1 to 16 carbon atoms, particularly preferably having from 1 to 12 carbon atoms, and including, for example, a mesyl group or a tosyl group), a sulfinyl group (preferably having from 1 to 20 carbon atoms, more preferably having from 1 to 16 carbon atoms, particularly preferably having from 1 to 12 carbon atoms, and including, for example, a methanesuifinyl group or a benzenesulfinyl group), a ureido group (preferably having from 1 to 20 carbon atoms, more preferably having from 1 to 16 carbon atoms, particularly preferably having from 1 to 12 carbon atoms, and including, for example, a ureido group, a methylureido group or a phenylureido group), a phosphoric amide group (preferably having from 1 to 20 carbon atoms, more preferably having from 1 to 16 carbon atoms, particularly preferably having from 1 to 12 carbon atoms, and including, for example, a diethyl phosphoric amide group or a phenyl, phosphoric amide group), a hydroxyl group, a mercapto group, a halogen atom (for example, a fluorine atom, a chlorine atom, a bromine atom, or an iodine atom), a cyano group, a sulfo group, a carboxyl group, a nitro group, a hydroxamic acid group, a sulfino group, a hydrazino group, an imino group, a heterocyclic group (preferably having from 1 to 30 carbon atoms, more preferably having from 1 to 12 carbon atoms, in which examples of the hetero atom includes a nitrogen atom, an oxygen atom and a sulfur atom, and specifically including, for example, an imidazolyl group, a pyridyl group, a quinolyl group, a furyl group, a piperidyl group, a morpholino group, a benzoxazolyl group, a benzimidazolyl group or a benzothiazolyl group), and a silyl group (preferably having from 3 to 40 carbon atoms, more preferably having from 3 to 30 carbon atoms, particularly preferably having from 3 to 24 carbon atoms, and including, for example, a trimethylsilyl group or a triphenylsilyl group).

The substituents may be further substituted. Moreover, when two or more substituents are present, the substituents may be the same or different from each other. In addition, when it is possible, the substituents may be combined with each other to form a ring.

In formula (4), it is preferred that X is —CH— and Y is —N—, and it is also preferred that $Q_1$ and $Q_2$ are —CO—. In formula (4), it is more preferred that X is —CH—, Y is —N— and $Q_1$ and $Q_2$ are —CO—.

Specific examples of the compound represented by formula (4) include Compounds P1 to P18 shown below.

TABLE 1

| | X | Y | $Q_1$ | $R_{11}$ | $Q_2$ | $R_{12}$ | $Q_3$ | $R_{13}$ |
|---|---|---|---|---|---|---|---|---|
| P1 | —N= | —N= | Single Bond | —H | Single Bond | —H | Single Bond | Phenyl |
| P2 | —N= | —N= | Single Bond | Phenyl | Single Bond | Phenyl | Single Bond | Phenyl |
| P3 | —N= | —N= | Single Bond | Phenyl | Single Bond | Phenyl | Single Bond | Methyl |
| P4 | —N= | —N= | Single Bond | Phenyl | Single Bond | Phenyl | —O— | Methyl |
| P5 | —N= | —N= | —C(=O)— | Phenyl | —C(=O)— | Phenyl | Single Bond | Methyl |
| P6 | —N= | —N= | —C(=O)— | Phenyl | —C(=O)— | Phenyl | —O— | Methyl |
| P7 | —N= | —N= | —C(=O)— | o-Methylphenyl | —C(=O)— | o-Methylphenyl | —O— | Methyl |
| P8 | —N= | —N= | —C(=O)— | m-Methylphenyl | —C(=O)— | m-Methylphenyl | —O— | Methyl |
| P9 | —N= | —N= | —C(=O)— | p-Methylphenyl | —C(=O)— | p-Methylphenyl | —O— | Methyl |
| P10 | —CH= | —N= | Single Bond | —H | Single Bond | —H | Single Bond | Phenyl |
| P11 | —CH= | —N= | Single Bond | Phenyl | Single Bond | Phenyl | Single Bond | Phenyl |
| P12 | —CH= | —N= | Single Bond | Phenyl | Single Bond | Phenyl | Single Bond | Methyl |
| P13 | —CH= | —N= | Single Bond | Phenyl | Single Bond | Phenyl | —O— | Methyl |

TABLE 1-continued

| | X | Y | $Q_1$ | $R_{11}$ | $Q_2$ | $R_{12}$ | $Q_3$ | $R_{13}$ |
|---|---|---|---|---|---|---|---|---|
| P14 | —CH= | —N= | —O—C(=O)— | Phenyl | —O—C(=O)— | Phenyl | Single Bond | Methyl |
| P15 | —CH= | —N= | —O—C(=O)— | Phenyl | —O—C(=O)— | Phenyl | —O— | Methyl |
| P16 | —CH= | —N= | —O—C(=O)— | o-Methylphenyl | —O—C(=O)— | o-Methylphenyl | —O— | Methyl |
| P17 | —CH= | —N= | —O—C(=O)— | m-Methylphenyl | —O—C(=O)— | m-Methylphenyl | —O— | Methyl |
| P18 | —CH= | —N= | —O—C(=O)— | p-Methylphenyl | —O—C(=O)— | p-Methylphenyl | —O— | Methyl |

The compound represented by formula (4) can be synthesized according to the method described in WO2012/074050.

The content of the compound represented by formula (4) in the polarizing plate protective film of the invention is not particularly limited, and is preferably from 1 to 15% by weight, more preferably from 2 to 10% by most preferably from 2 to 9% by weight, with respect to the total weight of the polarizing plate protective film.

[Retardation of Polarizing Plate Protective Film]

In the specification, Re (λ) and Rth (λ) indicate an in-plane retardation and a retardation in a thickness direction at a wavelength λ, respectively. The Re is measured by means of KOBRA 21ADH (produced by Oji Scientific Instruments Co., Ltd.) while applying light having a wavelength of λ nm in the normal line direction of the film. The Rth (λ) is calculated by KOBRA 21ADH based on retardation values measured in the three directions, that is, the Re described above, a retardation value obtained by measuring while applying light having a wavelength of λ nm the direction tilted at +40° from the normal line direction of the film using an in-plane slow axis (determined by KOBURA 21ADH) as a tilt axis (rotation axis) and a retardation value obtained by measuring while applying light having a wavelength of λ nm in the direction tilted at −40° from the normal line direction of the film using an in-plane slow axis as a tilt axis (rotation axis). In the above measurement, as the assumed value of average refractive index, values described in Polymer Handbook (JOHN WILEY & SONS, INC. and catalogs of various optical films can be used. In the case where a value of average refractive index is unknown, the value can be measured by an Abbe refractometer. The average refractive indexes of major optical films are shown below: cellulose acylate (1.48), cycloolefin polymer 52), polycarbonate (1.59), polymethyl methacrylate (1.49), and polystyrene (1.59). By inputting the assumed value of the average refraction index and film thickness, nx, ny and nz are calculated by KOBRA 21ADH. Moreover, Nz=(nx−nz)/(nx−ny) is calculated from the calculated nx, ny and nz.

The Re and Rth are represented by formulae shown below.

$$Re=(nx-ny) \times d$$

$$Rth=\{(nx+ny)/2-nz\} \times d$$

In the above formulae, nx represents a refractive index in the in-plane slow axis direction, ny represents a refractive index in the in-plane fast axis direction, nz represents a refractive index in the film thickness direction, and d represents a thickness (nm) of film.

The polarizing zing plate protective film of the invention can be used in liquid crystal display devices of various display systems. In particular, in the case where it is used in a liquid crystal display device of VA (Vertical Alignment) system or IPS (In Plane Switching) system, it is preferred that the retardation value in the in-plane direction (Re (550)) measured at a measuring wavelength of 550 nm and at temperature of 25° C. and relative humidity of 60% is from −20 to 120 cm, and the retardation value in a thickness direction (Rth (550)) at a wavelength of 550 nm is from −70 to 300 nm. Moreover, in the case where it is used in a liquid crystal display device of VA system, it is more preferred that the Re (550) measured at a measuring wavelength of 550 nm and at temperature of 25° C. and relative humidity of 60% is from 20 to 80 nm, and the Rth (550) is from 80 to 300 nm.

By fulfilling the range described above as to the Re and the Rth, in the case where the polarizing plate protective film of the invention is used in a liquid crystal display device, the effect is achieved in that both light leakage when viewing form the front and light leakage when viewing from an oblique direction are hard to visually recognized.

As described above, the polarizing plate protective film of the invention can be used as a retardation film by controlling the optical properties, and is preferably used as a retardation film for a liquid crystal display device of VA system or a retardation film for a liquid crystal display device of IPS system.

The film thickness of the polarizing plate protective film of the invention is preferably from 20 to 100 μm, and more preferably from 25 to 80 μm. In particular, in the case where it is used in the VA liquid crystal display device, the film thickness is still more preferably from 30 to 55 μm. Also, in the case where it is used in the IPS liquid crystal display device, the film thickness is still more preferably from 20 to 45 μm.

Moreover, the layer construction of the polarizing plate protective film of the invention is not particularly limited, and may be a single layer or may be composed of plural layers, for example, a core layer and a skin layer.

The thickness of the skin layer is preferably from 0.3 to 5 μm, more preferably from 0.3 to 3 μm, and still more preferably from 0.3 to 2 μm.

The thickness of the skin layer is measured by using FE3000 (produced by Otsuka Electronics Co, Ltd.).

The thickness of the core layer is determined by measuring the thickness of the whole layers by a contact-type thickness meter and subtracting the thickness of the skin layer from the overall thickness. The preferred thickness of the core layer corresponds with a value obtained by subtracting the preferred thickness of the skin layer from the preferred overall thickness described above.

Furthermore, a functional layer may be stacked separately and the functional layer includes, for example, a retardation layer, a hard coat layer, an antiglare layer and an antireflection layer.

[Additives]

According to the invention, as the additives of the polarizing plate protective film, known additives can be used. Specific examples of the additive include a retardation controlling agent-adjusting agent, a degradation preventing agent, an ultraviolet preventing agent, a release accelerating agent, a plasticizer, an infrared absorbing agent and a matting agent.

[Production Method of Polarizing Plate Protective Film]

The production method of a polarizing plate protective film of the invention is not particularly limited. For example, the polarizing plate protective film can be produced by film-forming a composition (also referred to as a dope in the case of liquid) containing a polymer having at least one of an ester bond and an amide bond and a compound which generates a base, and, if desired, a solvent and other additives, by using a known film-forming method of polymer film.

Hereinafter, the production method of a polarizing plate protective film in the case of using a cellulose acylate is described as an example.

(Preparation of Dope)

In the production method of a polarizing plate protective film of the invention, it is preferred to produce by a solvent casting method. According to the solvent casting method, the film can be produced by co-casting using a dope for forming a core layer and a dope for forming a skin layer.

As to an organic solvent, it is preferred to contain a solvent selected from an ether having from 3 to 12 carbon atoms, a ketone having from 3 to 12 carbon atoms, an ester having from 3 to 12 carbon atoms and a halogenated hydrocarbon having from 1 to 6 carbon atoms. The ether, ketone and ester may have a cyclic structure. A compound having any two or more functional groups of the ether, ketone and ester (that is, —O—, —CO— and —COO—) can also be used as the organic solvent. The organic solvent may have other functional group, for example, an alcoholic hydroxyl group. In the case of the organic solvent having two or more kinds of functional groups, the number of carbon atoms included may be within the range defined for the compound having any of the functional groups.

Examples of the ether having from 3 to 12 carbon atoms include diisopropyl ether, dimethoxymethane, dimethoxyethane, 1,4-dioxane, 1,3-dioxolane, tetrahydrofuran, anisole and phenetole.

Examples of the ketone having from 3 to 12 carbon atoms include acetone, methyl ethyl ketone, diethyl ketone, diisobutyl ketone, cyclohexanone and methylcyclohexanone.

Examples of the ester having from 3 to 12 carbon atoms include ethyl formate, propyl formate, pentyl formate, methyl acetate, ethyl acetate and pentyl acetate.

Examples of the organic solvent having two or more kinds of functional groups include 2-ethoxyethyl acetate, 2-methoxyethanol and 2-butoxyethanol.

The number of carbon atoms in the halogenated hydrocarbon is preferably 1 or 2, and most preferably 1. The halogen of the halogenated hydrocarbon is preferably chlorine. The ratio of a halogen substituting for hydrogen atom of the halogenated hydrocarbon is preferably from 25 to 75% by mole, more preferably from 30 to 70% by mole, still more preferably from 35 to 65% by mole, and most preferably from 40 to 60% by mole. Methylene chloride is the representative halogenated hydrocarbon.

The preparation of dope can be performed by using a preparation method of dope and an apparatus in a conventional solvent casting method.

A dope can be prepared by stirring the polymer and the organic solvent at normal temperature (from 0 to 40° C.). The dope of high concentration may be stirred under pressurizing and heating conditions. Specifically, the polymer and the organic solvent are charged into a pressure vessel and hermetically sealed, and the mixture is stirred under pressure while heating at a temperature which is not lower than the boiling point of the solvent at normal pressure and does not cause boiling of the solvent. The heating temperature is ordinarily 40° C. or more, preferably from 60 to 200° C., and more preferably from 80 to 110° C.

The respective components may be coarsely mixed in advance and charged into the vessel or may be sequentially charged into the vessel. The vessel needs to be configured to allow for stirring. The vessel can be pressurized by injecting an inert gas, for example, nitrogen gas. Also, a rise in the vapor pressure of the solvent due to heating may be utilized. Alternatively, after hermetically closing the vessel, the respective components may be added under pressure.

In the case of heating, the mixture is preferably heated from the outside of the vessel. For example, a jacket-type heating apparatus can be used. It is also possible to heat the entire vessel by providing a plate heater on the outside of the vessel, piping and circulating liquid therein.

It is preferred that a stirring blade is provided in the inside of the vessel to perform the stirring by using it. A stirring blade having a length long enough to reach the vicinity of the vessel wall is preferred. At the end of the stirring blade, a scraping blade is preferably provided so as to renew the liquid film, on the vessel wall.

The vessel may be provided with measuring instruments, for example, a pressure gauge and a thermometer. In the vessel, the respective component are dissolved in the solvent. The dope prepared is cooled and then taken out from the vessel or is taken out from the vessel and then cooled by using a heat exchanger or the like.

(Co-Casting)

The co-casting method is a casting method in which the dopes for forming the respective layers (two layers or more layers) are simultaneously extruded through a casting Gieser to simultaneously cast all the layers on a drum or a band, and the coating is peeled off from the support at an appropriate time and dried to form a film. Moreover, the co-casting may be successively performed.

The surface of the drum or band is preferably mirror-finished. The casting and drying methods in the solvent casing method are described in U.S. Pat. Nos. 2,336,310, 2,367,603, 2,492,078, 2,492,977, 2,492,978, 2,607,704, 2,739,069 and 2,739,070, British Patents 640,731 and 736, 892, JP-B-45-4554 (the term "JP-B" as used herein means an "examined Japanese patent publication"), JP-B-49-5614, JP-A-60-176834, JP-A-60-203430 and JP-A-62-115035.

According to a preferred embodiment of the production method of a polarizing plate protective film of the invention, there is provided a production method of a polarizing plate protective film having a core layer and a skin layer, which includes a step of co-casting a dope for forming a core layer containing the cellulose acylate and a dope for forming a skin layer containing the cellulose acylate, wherein at least any one of the dope for forming core layer and the dope for forming a skin layer contains a compound which generates a base by the action of an acid.

The solid content concentration of the dope for forming a core layer is preferably from 12 to 25% by weight, and more preferably from 15 to 25% by weight.

The solid content concentration of the dope for forming a skin layer is preferably from 12 to 25% by weight, and more preferably from 12 to 20% by weight.

[Polarizing Plate]

The polarizing plate of the invention includes the polarizing plate protective film of the invention and a polarizer. As the polarizer, a known polarizer can be used. The typical polarizer is a polyvinyl alcohol film dyed with iodine.

[Liquid Crystal Display Device]

The liquid crystal display device of the invention includes a liquid crystal cell and the polarizing plate of the invention described above. The liquid crystal display device including a liquid crystal cell and two polarizing plates disposed on both sides of the liquid crystal cell, wherein at least one of the polarizing plates is the polarizing plate of the invention described above, is more preferred.

The polarizing plate protective film of the invention and the polarizing plate using the polarizing plate protective film described above can be applied to liquid crystal cells and liquid crystal display devices of various display modes. Various display systems, for example, TN (Twisted Nematic), IPS (In-Plane Switching), FLC (Ferroelectric Liquid Crystal), AFLC (Anti-ferroelectric Liquid Crystal), OCB (Optically Compensatory Bend), STN (Sipper Twisted Nematic), VA (Vertically Aligned) or HAN (Hybrid Aligned Nematic) are proposed.

In the liquid crystal display device of the invention, the liquid crystal cell is preferably a liquid crystal cell of VA system or IPS system, and particularly preferably a liquid crystal cell of VA system.

EXAMPLES

The invention will be described more specifically with reference to the examples below. The materials, amounts of use, proportions, contents of treatments, treating procedures and the like described in the examples can be appropriately altered as long as the gist of the invention is not exceeded. Therefore, the scope of the invention should not be construed as being limited to the specific examples described below.

[Production of Film of Examples 1 to 17 and Comparative Examples 1 to 4 (Production of Retardation Film for Liquid Crystal of VA Mode)

The acyl substitution degree (Ac substitution degree) and propionyl substitution degree (Pr substitution degree) of Cellulose acylates 1 to 5 used are shown in Table 2 below.

TABLE 2

|  | Ac Substitution Degree | Pr Substitution Degree |
| --- | --- | --- |
| Cellulose Acylate 1 | 2.43 | 0 |
| Cellulose Acylate 2 | 2.81 | 0 |
| Cellulose Acylate 3 | 1.8 | 0 |
| Cellulose Acylate 4 | 1.6 | 0.9 |
| Cellulose Acylate 5 | 2.88 | 0 |

Examples 1 to 17 and Comparative Examples 1 to 4

<Preparation of Dope>

The components shown in Table 4 below were charged together with a solvent into a mixing tank and stirred to dissolve the respective components, thereby preparing a dope for forming a core layer and a dope for forming a skin layer.

As the solvent, a solvent prepared by mixing methylene chloride and methanol in a weight ratio of 87/13 was used, and the solid content concentrations were adjusted to 20% by weight in the dope for forming a core layer and 16% by weight in the dope for forming a skin layer, respectively.

TABLE 3

| Dicarboxylic Acid | | | | |
| --- | --- | --- | --- | --- |
| | TPA (Terephthalic Acid) | PA (Phthalic Acid) | AA (Adipic Acid) | SA (Succinic Acid) |
| Oligomer 1 | 70 | 0 | 0 | 30 |
| Oligomer 2 | 50 | 0 | 0 | 50 |

TABLE 3-continued
| | | | | |
|---|---|---|---|---|
| Oligomer 3 | 0 | 0 | 100 | 0 |
| Oligomer 4 | 100 | 0 | 0 | 0 |
| | Diol | | | |
|---|---|---|---|---|
| | EG (Ethylene Glycol) | PG (Propylene Glycol) | Terminal | Number Average Molecular Weight |
| Oligomer 1 | 50 | 50 | Ac | 1,000 |
| Oligomer 2 | 50 | 50 | Ac | 950 |
| Oligomer 3 | 70 | 30 | Ac | 1,000 |
| Oligomer 4 | 0 | 100 | Tolyl | 600 |
(in Table 3, Ac represents a acetyl group, and Tolyl represents a p-tolyl group)
Additives S1 to S3
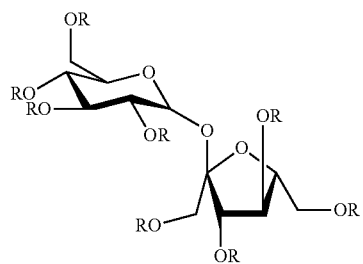
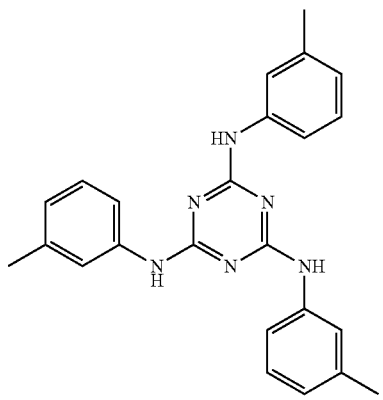
L
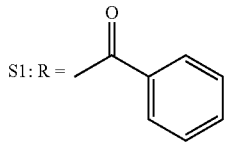
S1: R = 
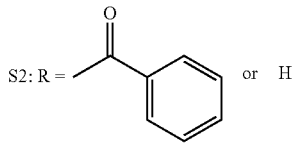
S2: R =  or  H
(6.5: 1.5)
S3: R = Acetate or 1-Butyrate (2:8)
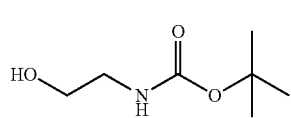
Gen1
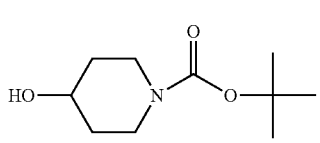
Gen2

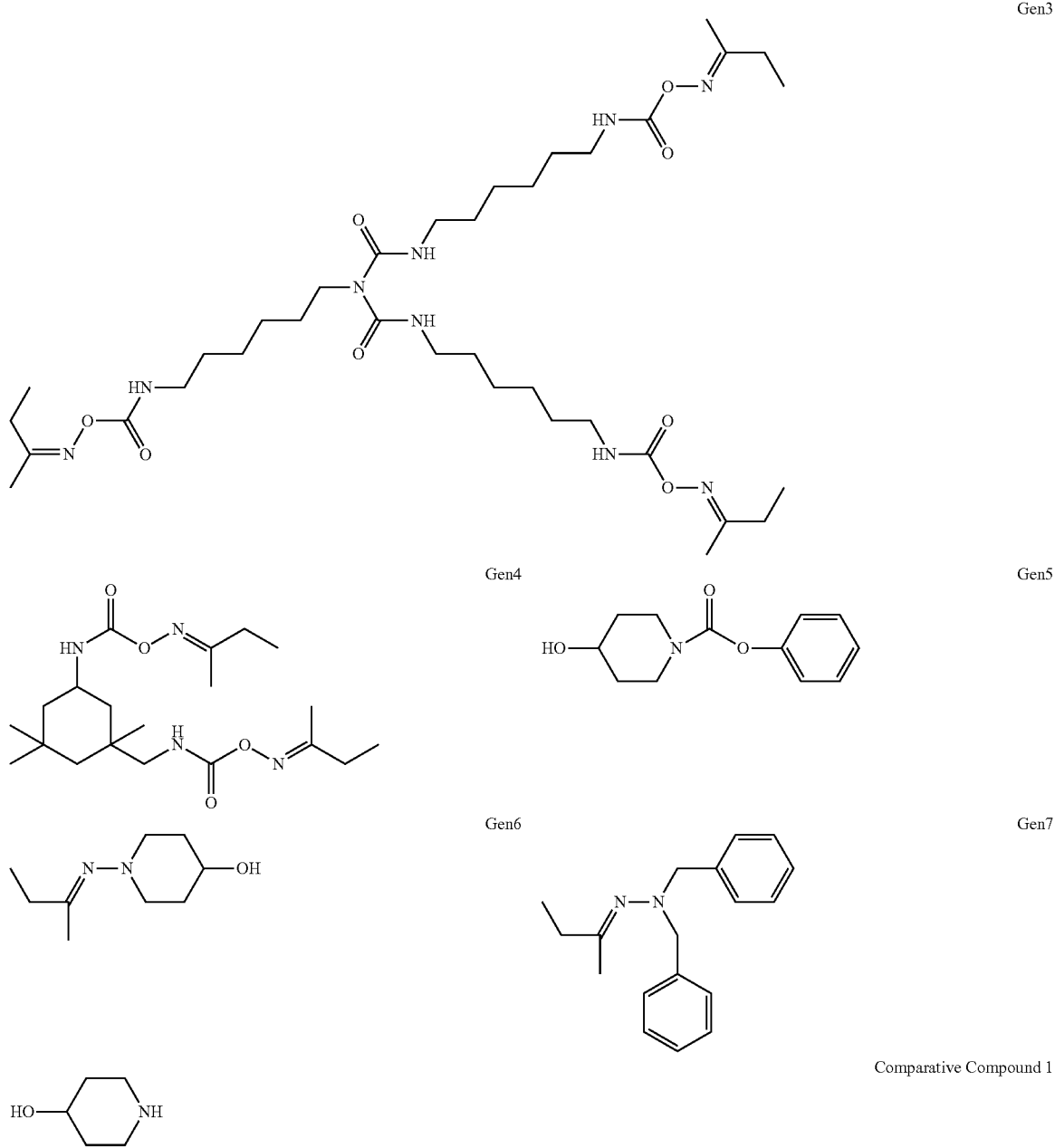

Gen 1 to Gen 7 are the compounds which generate a base by the action of an acid and all have the maximum value of absorption of 280 nm or less. In particular, Gen 1 to Gen 4 and Gen 6 have the maximum value of absorption of 250 nm or less and have good properties. The pKa of the conjugated acid of the base generated from each of the compound was less than 4.

(Preparation of Matting Agent Dispersion M1)

The composition shown below was charged into a dispersing machine and stirred to dissolve the respective components, thereby preparing Matting agent dispersion M1.

| | |
|---|---|
| Silica particle having average particle size of 20 nm (AEROSIL (registered trademark) R972, produced by Nippon Aerosil Co., Ltd.) | 2.0 parts by weight |

-continued

| | |
|---|---|
| Methylene chloride | 76.1 parts by weight |
| Methanol | 11.4 parts by weight |
| Dope for forming skin layer | 12.6 parts by weight |

(Preparation of Dope for Forming Skin Layer)

Matting agent dispersion M1 was mixed with the dope for forming a skin layer as prepared above in the ratio shown below to prepare a dope for forming a skin layer of casting support side.

| | |
|---|---|
| Dope for forming skin layer | 100.0 parts by weight |
| Matting agent dispersion M1 | 7.1 parts by weight |

<Film-Formation of Polarizing Plate Protective Film>
(Casting)

The dope solutions prepared as above were used in the combination shown in Table 4 to cast using a band casting machine. In the casting, the dope for forming a skin layer of casting support side, the dope for forming a core layer and the dope for forming a skin layer were co-cast in order from the casting support side.

In the casting of the dope solutions, the dopes were co-cast from a casting die onto a running band. Here, by adjusting the flow amount of each dope to provide the core layer having the largest thickness, simultaneous multi layer co-casting was performed so as to set consequently the film thickness of the film and the layer thickness of the skin layer after stretching to the values shown in Table 4, thereby forming a cast film.

However, in Examples 8 and 17, the co-casting was not performed, but the dope for forming a core layer was cast alone so as to set the total film thickness of the film to the values shown in Table 4, thereby forming a cast film.

Then, the cast film was peeled off from the casting band to form a wet film, and the wet film was dried in a transfer section and a tenter to form a film. The residual solvent amount just after peeling of the dope was about 25% by weight. The film was fed to a drying chamber in which it was fully dried while being wound around and transferred by a large number of rollers.

(Stretching)

The film obtained by casting was gripped by clips and stretched in a lateral direction under the fixed-end uniaxial conditions. The stretching temperature and the stretching ratio are shown in Table 4 below.

The stretching ratio is obtained according to the formula shown below.

Stretching ratio=(film length after stretching−film length before stretching)/film length before stretching×100(%)

(Humidity and Heat Treatment)

Each film undergone the stretching treatment was subjected to a dew condensation prevention treatment, a humidity and heat treatment (water vapor contact treatment) and a thermal treatment in order.

In the dew condensation prevention treatment, dried air was blown to each film, and the film temperature Tf0 was adjusted to 120° C.

In the humidity and heat treatment (water vapor contact treatment), adjustment was made in such a manner that the absolute humidity (humidity and heat treatment absolute humidity) of a wet gas in a wet gas contact chamber reached 250 g/m$^3$ and the dew point of the wet gas reached a temperature 10° C. or higher than the temperature Tf0 of each film, and each film was transported while maintaining a state in which the temperature (humidity and heat treatment temperature) of each film reached 100° C. for a treatment time (60 seconds).

In the thermal treatment, the absolute humidity (thermal treatment absolute humidity) of a gas in a thermal treatment chamber was set to 0 g/m$^3$, the temperature (thermal treatment temperature) of each film was set to the same temperature as the heat and humidity treatment temperature, and the absolute humidity and the temperature were maintained for a treatment time (2 minutes). The film surface temperature was determined from the average value of temperatures measured at three points of the film stuck with tape-type thermocouple surface temperature sensors (ST Series produced by Anritsu Meter Co., Ltd.)

(Winding)

Then, after cooling to room temperature, each film was wound up to obtain the polarizing plate protective film of each of Examples 1 to 17 and Comparative Examples 1 to 4.

Example 18

The composition shown below was charged into a mixing tank, stirred to dissolve the respective components, heated at 90° C. for about 10 minutes, and then filtered using filter paper having an average pore diameter of 34 μm and a sintered metal filter having an average pore diameter of 10 μm.

| | |
|---|---|
| Cellulose acylate 5 | 100.0 parts by weight |
| Oligomer 3 | 15 parts by weight |
| Gen3 | 0.2 parts by weight |
| Methylene chloride | 451.0 parts by weight |
| Methanol | 39.0 parts by weight |

(Preparation of Matting Agent Dispersion 2)

The composition shown below containing the dope for Example 18 was charged into a dispersing machine to prepare a matting agent dispersion.

| | |
|---|---|
| Silica particle having average particle size of 20 nm (AEROSIL (registered trademark) R972, produced by Nippon Aerosil Co., Ltd.) | 0.2 parts by weight |
| Methylene chloride | 72.4 parts by weight |
| Methanol | 10.8 parts by weight |
| Dope for Example 18 | 10.3 parts by weight |

(Preparation of Dope for Film Formation)

Dope for Example 18 (100 parts by weight) and Matting agent dispersion 2 were mixed in such a manner that the content of the silica particle reached 0.20 parts by weight with respect to the cellulose acylate, thereby preparing a dope for film formation.

<Film Formation of Polarizing Plate Protective Film>
(Casting)

The dope for film formation described above was cast using a band casting machine to form a cast film.

(Drying)

The cast film was peeled off from the band and was dried at 100° C. for 20 minutes using a tenter device in which a web was transported while clipping both ends of the web with clips.

Then, the film was further transported in a drying zone at a drying temperature of 120° C. to dry the film.

The drying temperature as referred to herein means a film surface temperature of the film.

(Winding)

Then, after cooling to room temperature, the film was wound up to produce a roll having a roll width of 1,340 mm and a roll length of 2,600 mm. The film thickness of the polarizing plate protective film thus-produced was 40 μm.

Example 19

Production of Retardation Film

A polarizing plate protective film was produced in the same manner as in Example 1 except for changing the addition amounts of the respective components and the stretching conditions to those shown in Table 4 below. The film thickness of the polarizing plate protective film was 40 μm. In Example 19, the polarizing plate protective film was used as a support and a retardation layer was formed on the support to produce a retardation film.

<Production of Retardation Film>
(Saponification Treatment)

The support produced as described above was immersed in 2.3 mol/L of an aqueous sodium hydroxide solution (liquid temperature of 55° C.) for 3 minutes. Then, the film was washed in a water-washing bath at room temperature and neutralized using 0.05 mol/L sulfuric acid at 30° C. The film was again washed in a water-washing bath at room temperature and dried with hot air at 100° C. In this manner, the saponification treatment of the surface of the support was performed.

(Formation of Acrylic Resin-Containing Layer)

100 parts by weight of acrylic mixture (ACR1 shown below: ACR2 shown below=67:33 weight ratio), 4 parts by weight of a photopolymerization initiator (Irgacure 127 (registered trademark) produced by BASF) and a solvent of MIBK (methyl isobutyl ketone)/methyl acetate (=30:70 weight ratio) were mixed so as to be 20% by weight, thereby preparing a composition for forming an acrylic resin-containing layer. The composition thus-prepared was coated on the surface of the support described above by a wire bar coater of #1.6, and the coating was dried at 60° C. for 0.5 minutes, and then irradiated with ultraviolet ray at 30° C. for 30 seconds using a high pressure mercury lamp of 120 W/cm in order to crosslink the acrylic mixture. The layer thickness of the acrylic resin-containing layer formed was 0.5 μm.

(ACR1: Blemmer (registered trademark) GLM produced by NOF Corp.) (compound having the structure shown below)

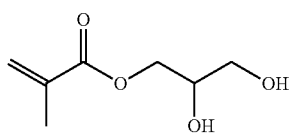

ACR2: Kayarad (registered trademark) PET30 produced by Nippon Kayaku Co. Ltd. (compound having the structure shown below) (mixture of pentaerythritol triacrylate/pentaerythritol tetraacrylate)

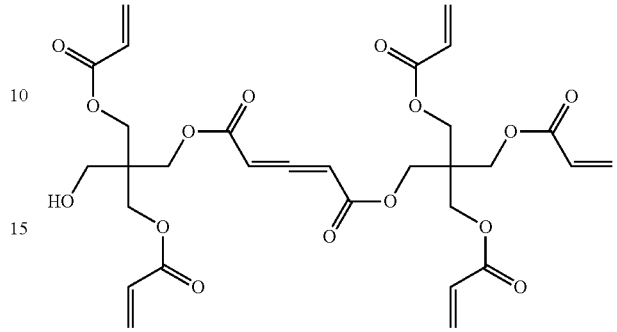

(Formation of Retardation Layer)

On the surface of the acrylic resin-containing layer formed as described above, a solution prepared by dissolving 1.8 g of a mixed liquid crystal (B01 shown below: B02 shown below=90:10 weight ratio), 0.06 g of a photopolymerization initiator (Irgacure 907 produced by BASF), 0.02 g of a sensitizer (Kayacure (registered trademark) DETX produced by Nippon Kayeku Co. Ltd.) and 10.002 g of a vertical orientation agent (S01 shown below) in 9.2 g of methyl ethyl ketone/cyclohexanone (=86/14 weight ratio) was coated by a wire bar coater of #3.2 to form a coating layer. The support having the coating layer formed on the acrylic resin-containing layer was stuck to a metal frame and heated in a thermostatic chamber at 100° C. for 2 minutes to orient (homeotropic orientation) the rod-like liquid crystal compound. After cooling to 50° C., ultraviolet ray having illumination intensity of 190 mW/cm$^2$ and irradiation dose of 300 mJ/cm$^2$ was irradiated using an air-cooled metal halide lamp of 160 W/cm (produced by Eye Graphics Co., Ltd) under nitrogen purge at an oxygen concentration of about 0.1% to cure the coating layer. Thereafter, the layer was allowed to cool to room temperature.

In this manner, a retardation film having the retardation layer on the support (polarizing plate protective film) through the acrylic resin-containing layer was obtained.

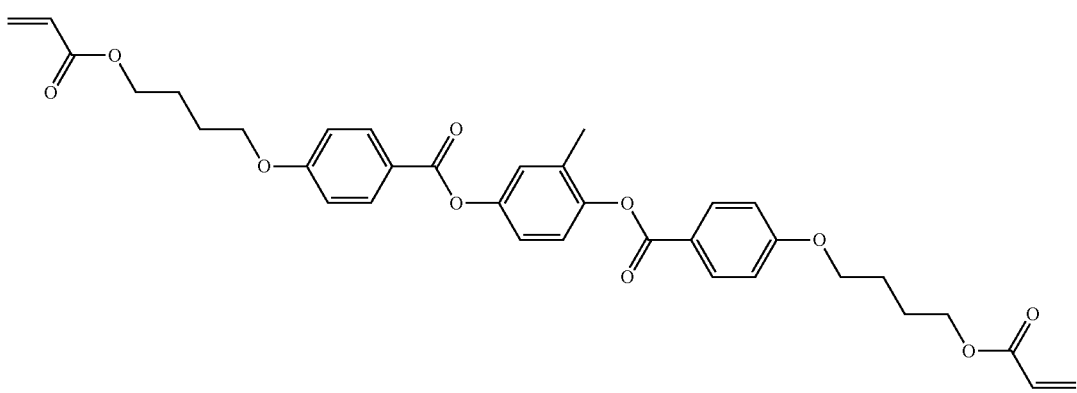

B01

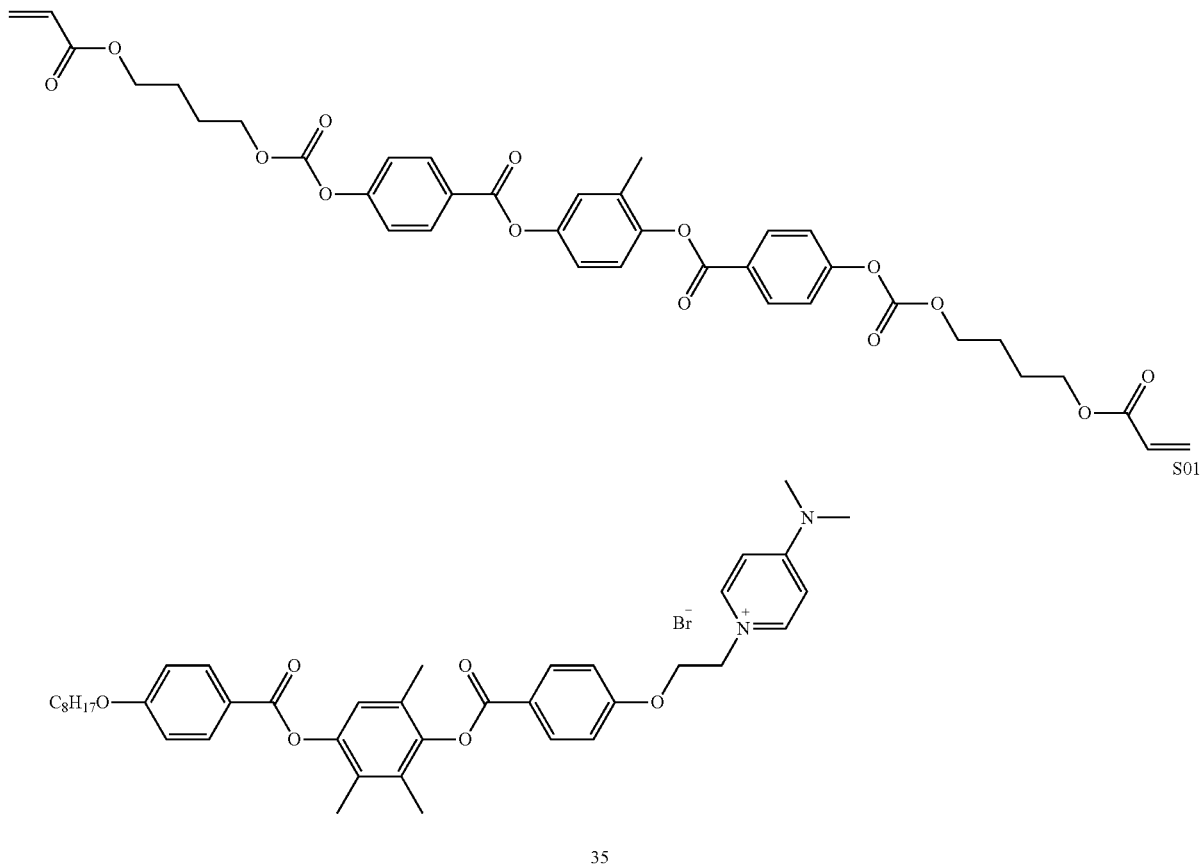

Production of Films of Example 20 and Comparative Example 5 (Solution Film Formation of Acrylic Film)

As a (meth)acrylic resin, a polymer having a molar ratio of repeating unit derived from methyl methacrylate:repeating unit derived from methyl acrylate=97:3 and Mw of 300,000 was used.

(Preparation of Dope)

Into a stainless steel vessel equipped with a reflux facility and a paddle type stirring blade, 84 parts by weight of methylene chloride as a good solvent was charged, 21.95 parts by weight of the dried (meth)acrylic resin described above was charged to be dissolved, and further 16 parts by weight of n-butanol as a poor solvent was charged, followed by stirring. Then, one part by weight of Gen2 with respect to 100 parts by weight of the (meth)acrylic resin was added to produce a dope. The concentration of the (meth)acrylic resin in the dope was 18% by weight.

(Film Formation)

The dope produced as described above was passed through a filter to remove foreign matters, fed to a casting die and uniformly cast on a stainless steel band support (metal support) at 22° C. in a width of 2 m using a belt casting apparatus (step 1)

On the stainless steel band support, the solvent was evaporated until the residual solvent amount reached 45%, the web was peeled off from the stainless steel band support while adjusting a peeling speed so as to maintain the tension at 162 N/m (step 2) The amount (% by mass) of the residual solvent is measured by subjecting a sample (7 mm×35 mm) to gas chromatography (GC-18A, manufactured by Shimadzu) to thereby quantify the base residual solvent.

The web of the (meth)acrylic resin peeled was stretched by a longitudinal stretching apparatus while evaporating the solvent at 35° C. The web was slit in a width of 1.6 m, and then dried at temperature of 135° C. while stretching 1.1 times in the width direction by a tenter (step 3)

After the stretching by the tenter, relaxation was performed at 130° C. for 5 minutes while gripping the web by the tenter (step 3). Then, the web was released from the tenter and passed through first a drying zone at 120° C. and next a drying zone at 140° C. while being transported by a large number of rollers to complete the drying (step 4). From the web before entering into the first drying zone and the web after coming out from the next drying zone at 140° C., samples were collected, and the solvent amount thereof were measured. The good solvent amount before the drying step was 4% by weight and the good solvent amount after the drying step was 0.1% by weight.

After the drying, the film was slit in a width of 1.5 m, subjected to knurling treatment of 10 mm in width and 5 μm in height on the both sides thereof, and wound around a core having an inner diameter of 15.24 cm at an initial tension of 220 N/m and a final tension of 110 N/m to obtain a (meth)acrylic resin film having a film thickness of 40 μm.

The stretching ratio in the MD direction (longitudinal direction) calculated from the rotation speed of the stainless steel band support and the driving speed of the tenter was 1.1 times. The film thickness of the film obtained was 40 μm and the winding length of the film was 4,000 m. The film thus-obtained was used as the polarizing plate protective film of Example 20. Also, the polarizing plate protective film of Comparative Example 5 was prepared in the same manner as in Example 20 except for not adding Gen2 in the preparation of the dope.

Next, in order to produce a polarizing plate, a protective film used on the side different from the side of the polarizing plate protective film produced as described above was produced.

<Production of Protective Film Disposed on Viewing Side of Polarizer>

(Preparation of Cellulose Ester Solution for First Skin Layer and Second Skin Layer)

The composition shown below was charged into a mixing tank and stirred with heating to dissolve the respective components, thereby preparing a cellulose ester solution for a first skin layer and a second skin layer.

| Cellulose acylate 5 | 100 parts by weight |
| Sugar ester compound S2 | 3 parts by weight |
| Sugar ester compound S3 | 1 part by weight |
| Ultraviolet absorbing agent | 2.4 parts by weight |
| Silica particle dispersion (average particle size: 20 nm) (AEROSIL (registered trademark) R972 produced by Nippon Aerosil Co., Ltd.) | 0.078 parts by weight |
| Methylene chloride | 339 parts by weight |
| Methanol | 74 parts by weight |
| Butanol | 3 parts by weight |

Ultraviolet absorbing agent

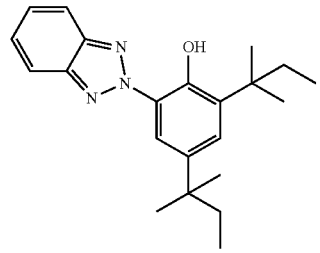 [SMILES: CCC(C)(C)c1cc(-n2nc3ccccc3n2)c(O)c(C(C)(C)CC)c1]

(Preparation of Cellulose Ester Solution for Core Layer)

The composition shown below was charged into a mixing tank and stirred with heating to dissolve the respective components, thereby preparing a cellulose ester solution for a core layer.

Composition of cellulose ester solution for core layer:

| Cellulose ester (acetyl substitution degree: 2.86) | 100 parts by weight |
| Sugar ester compound S2 shown above | 7.7 parts by weight |
| Sugar ester compound S3 shown above | 2.3 parts by weight |
| Ultraviolet absorbing agent shown above | 2.4 parts by weight |
| Methylene chloride | 266 parts by weight |
| Methanol | 58 parts by weight |
| Butanol | 2.6 parts by weight |

(Film Formation by Co-Casting)

As a casting die, an apparatus equipped with a feed block adjusted for co-casting and capable of forming a film of three layer structure was used. The cellulose ester solution for a first skin layer, the cellulose ester solution for a core layer and the cellulose ester solution for a second skin layer were co-cast from the casting die on a drum (mirror surface stainless steel support) having a diameter of 3 m cooled at −7° C., and dry air at 34° C. was blown at 270 m³/min onto the drum. In the co-casting, the flow rate of each dope was adjusted so as to set a ratio of thickness of first skin layer/core layer/second skin layer=5/53/2.

The cellulose ester film cast and rotated was peeled off from the drum at the point 50 cm, be the terminal end of casting unit and clipped the both ends thereof with a pin tenter. At the peeling, the film was stretched by 5% in the transporting direction (MD direction).

The cellulose ester web held with the pin tenter was transported into a drying zone. At the initial drying, dry air at 45° C. was blown onto the web, and then the web was dried at 110° C. for 5 minutes. In the drying zone, the cellulose ester web was transported while stretching at a stretching ratio of 10% in the direction (TD direction) perpendicular to the transporting direction.

After releasing the web from the pin tenter, the portions held by the pin tenter were continuously cut off and dried at 145° C. for 10 minutes while applying tension of 210 N in the MD direction. Further, the edge portion in the width direction was continuously cut off so as to achieve the desired width, and the uneven of 15 mm in width and 10 μm in height was formed on each of the both edge portions in the width direction of the web, thereby forming a film having a film thickness of 60 μm, which was designated as Protective film A.

<Production of Coating Solution for Antiglare Layer>

(Synthesis of Synthetic Smectite)

Into a 10 L beaker was put 4 L of water, 860 g of No. 3 water glass (SiO₂: 28%, Na₂O: 9%, molar ratio:3.22) was dissolved therein, and 162 g of 95% by weight sulfuric acid was added thereto at one time with stirring, thereby obtaining a silicate solution. Next, 560 g of MqCl₂.6H₂O primary reagent (purity: 98%) was dissolved in 1 L of water, and the resulting solution was added to the silicate solution described above, thereby preparing a homogeneous mixed solution. The homogeneous mixed solution was added dropwise to 3.6 L of an aqueous 2 mol/L NaOH solution with stirring over a period of 5 minutes.

The reaction precipitate composed of silicon-magnesium complex (homogeneous complex composed of an aggregate of colloid particles) thus-obtained was immediately filtered using a cross-flow filtration system produced by NGK Insulators, Ltd. [a cross-flow filter (ceramic film filter, pore diameter: 2 μm, tubular type, filtration area: 400 cm²)], sufficiently washed with water, and a solution composed of 200 ml of water and 14.5 g of LiOH.H₂O was added thereto to form a slurry. The slurry was moved to an autoclave and subjected to hydrothermal reaction at 41 kg/cm² and 250° C. for 3 hours. After cooling, the reactant was taken out, dried at 80° C., and pulverized, thereby obtaining synthetic smectite having a composition of hectorite which was one kind of smectite and represented by the formula shown below.

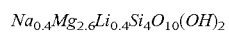

$Na_{0.4}Mg_{2.6}Li_{0.4}Si_4O_{10}(OH)_2$ (Synthesis of Smectite Clay Organic Complex 1)

In 1,000 ml of tap water was dispersed 20 g of the synthetic smectite obtained as described above. To the dispersion was added 300 ml of a solution prepared by dissolving 11.1 g a substance containing 80% by weight of trioctyl methyl ammonium chloride (2.2 millimole calculated in terms of trioctyl methyl ammonium chloride), which was a quaternary ammonium salt, in pure water, and the mixture was allowed to react at room temperature (25° C.)

for 2 hours with stirring. Then, the product was subjected to solid-liquid separation, washed to remove the by-produced salts, dried, and pulverized to obtain Smectite clay organic complex 1.

[Preparation of Coating Solution for Antiglare Layer]

Composition of coating solution for antiglare layer:

| Smectite clay organic complex 1 | 1.20 parts by weight |
|---|---|
| Resin particle | 8.00 parts by weight |
| RET-30 | 90.65 parts by weight |
| Irg907 | 3.00 parts by weight |
| SP-13 | 0.15 parts by weight |
| Ajisper PB881 | 0.30 parts by weight |

The composition described above was mixed with a mixed solvent of MIBK (methyl isobutyl ketone): MEK (methyl ethyl ketone)=85:15 (weight ratio). The mixture was filtered using a polypropylene filter having a pore diameter of 30 μm to prepare a coating solution for antiglare layer. The solid content concentration of the coating solution was 35% by weight. In the preparation of the coating solution, the resin particle and the Smectite clay organic complex 1 were added in the form of dispersion, but in the composition of the coating solution for antiglare layer described above, the resin particle and the Smectite clay organic complex 1 were expressed in terms of the solid content.

(Preparation of Resin Particle Dispersion)

The resin particle dispersion was prepared by gradually adding the resin particles to an MIBK solution with stirring until the solid content concentration of the dispersion reached 30% by weight and stirring for 30 minutes.

As the resin particles, light transmitting crosslinked styrene-methyl methacrylate copolymer particles prepared by appropriately changing the copolymerization ratio between styrene and methyl methacrylate in such a manner that an average particle diameter and a refractive index were 2.5 μm and 1.52, respectively, were used (produced by Sekisui Plastics Co., Ltd.)

(Preparation of Dispersion of Smectite Clay Organic Complex 1)

The dispersion of Smectite clay organic complex 1 was prepared gradually adding Smectite clay organic complex 1 to MEK which was all to be finally used for the coating solution for an antiglare layer with stirring and stirring for 30 minutes.

The respective compounds used are described below.

PET-30: A mixture of pentaerythritol triacrylate and pentacrythritol tetraacrylate (produced by Nippon Kayaku Co., Ltd.)

Irg907: Acetophenone-based photopolymerization initiator (produced by BASF)

Ajisper PB881 Polymer pigment dispersant (produced by Ajinomoto Fine Chemical Co., Ltd.)

SP-13: Fluorine-based surfactant shown below (60:40 (molar ratio))

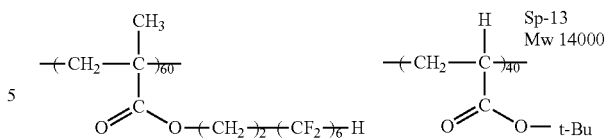

Mw indicates a weight average molecular weight.

(Coating of Antiglare Layer)

An antiglare layer was coated on a surface of Protective film A which had been an air interface in the production of Protective film A so as to form a coating layer having a layer thickness of 5.5 μm, thereby producing Protective film B.

Specifically, the coating solution for an antiglare layer described above was coated under a condition of a conveying speed of 30 m/minute by a die coating method using a slot die described in Example 1 of JP-A-2006-122889, dried at 80° C. for 150 seconds, further irradiated with ultraviolet ray having illumination intensity of 400 mW/cm$^2$ and irradiation dose of 180 mJ/cm$^2$ using an air-cooled metal halide lamp of 160 W/cm (produced by Eye Graphics Co., Ltd.) under nitrogen purge at an oxygen concentration of about 0.1% to cure the coating layer to form an antiglare layer, followed by winding, thereby producing Protective film B provided with the antiglare layer.

<Production of Polarizing Plate>

A polyvinyl alcohol film in a roll state was continuously stretched 5 times in an aqueous iodine solution and dried to obtain a polarizer.

Moreover, an aqueous 3% by weight polyvinyl alcohol (PVA-117H produced by Kuraray Co., Ltd.) solution was prepared as an adhesive. The polarizing plate protective films of Examples 1 to 20 and Comparative Examples of 1 to 5 which had been subjected to an alkali saponification treatment (immersing in an aqueous 2 mol % sodium hydroxide solution at 50° C. for 90 seconds, washing with water, and drying) and Protective in B were prepared. The polarizer was sandwiched between the polarizing plate protective film and Protective film B to be stuck, thereby obtaining a polarizing plate. With respect to the polarizing plate protective films of Examples 1 to 18 and 20 and Comparative Examples of 1 to 5, each of these films was disposed in such a manner that the surface of the film which had been on the air interface side in the film formation faced the polarizer, and with respect to the retardation film of Example 19 and protective film B, each of these films was disposed in such a manner that the surface of the film having no coating layer faced the polarizer, and each of the polarizing plate protective films of Examples 1 to 20 and Comparative Examples of 1 to 5, the polarizer and the Protective film B were stuck in this order. In the sticking, each of the polarizing plate protective films of Examples 1 to 20 and Comparative Examples of 1 to 5 and Protective film B were stuck in such a manner that the MD directions thereof were parallel to the absorption axis of the polarizer.

[Evaluation of Polarizing Plate Protective Films and Polarizing Plates of Examples 1 to 20 and Comparative Examples 1 to 5]

As to the each of the films and the polarizing plates, the performances were evaluated according to the items described below. The evaluation results are shown in Tables 5 and 6 below.

<<Retardation of Polarizing Plate Protective Film>>

The in-plane retardon Re and the retardation in a thickness direction Rth were measured using KOBRA 21ADH (produced by Oji Scientific Instruments Co., Ltd.) at temperature of 25° C., relative humidity of 60% and a measurement wavelength of 550 nm. As to Example 19, the measurement was performed after the coating layer (retardation layer) had been coated.

<<Peeling-Off Property from Band>>

With respect to each of the films, the peeling-off property from a band (peelability) was evaluated based on the evaluation method shown below. When the evaluation result of the peeling-off property shown below is ranked 1 or 2, the film can be used at a level of practically no problem.

(Evaluation Criteria of Peeling-Off Property)
1: Peelability was very good, and optical unevenness of the film after peeling was hardly visually recognized.
2: Peeling was performed and step-like thickness unevenness of the film did not occur, but optical unevenness was visually recognized.
3: Peelability was very poor, and in addition to the occurrence of step-like thickness unevenness of the film, the film was partially extended at the peeling.

<<Viscosity Change Ratio after High Temperature High an Humidity Storage>>

With respect to the polarizing plates of the examples and comparative examples, each of those of Examples 1 to 19 and Comparative Examples 1 to 4 was stored in an environment at 85° C. and relative humidity of 85% for 1,000 hours, and each of those of Example 20 and Comparative Example 5 was stored in an environment at 90° C. and relative humidity of 90% for 1,000 hours. After the storage, the polarizing plate was immersed in a warm water at 60° C. for 24 hours, taken out, dissolved in trifluoroacetic acid (TFA) to prepare a solution, and viscosity measurement of the solution was performed. The solution was maintained at 5° C. or less jest before the measurement in order to prevent further decomposition of the polymer. A one w/v % TFA solution of each sample was prepared, and the viscosity was measured using an Ubbelohde viscometer (flow time of pure water at 30° C. being 30 seconds).

The viscosity change ratio was represented as shown below using flow time (Ts) of TFA, flow time (Ta) of the film after high temperature and high humidity storage and flow time (Tb) of the film before high temperature and high humidity storage. When the evaluation result of the viscosity change ratio shown below is ranked 1 to 3, it is able to be judged that there is no problem in practical use.

(Evaluation Criteria of Viscosity Change Ratio)

(Viscosity change ratio)=100×(Ta−Ts)/(Tb−Ts)

1: Viscosity change ratio≥95%
2: 95%>Viscosity change ratio≥90%
3: 90%>Viscosity change ratio≥75%
4: Viscosity change ratio<75%

<<Optical Property Change Amount α After High Temperature and Low Humidity Storage>>

Two samples (5 cm×5 cm) in which each of the polarizing plates of the examples and the comparative examples was stuck on a glass through a cohesive agent were prepared. In the sticking, each of the polarizing plate protective films of the examples and the comparative examples produced as above was stuck in such a manner that it faced the side of the glass. The two samples were subjected to humidity conditioning in an environment at 25° C. and relative humidity of 60% for 24 hours, then the glass side of the sample was set so as to face a light source, and Rth (wavelength 550 nm) of each of the polarizing plate protective films of the examples and the comparative examples was separately measured. Here, the separation measurement is a method in which the optical property is measured in the form of polarizing plate, and the optical property of the polarizing plate protective film stuck onto the glass side is separately measured by analysis. The two samples were measured respectively to obtain the value of initial Rth (550).

Subsequently, the two samples were stored in a dry environment at 80° C. for 1,000 hours and further subjected to humidity conditioning in an environment at 25° C. and relative humidity of 60% for 24 hours, and Rth (wavelength 550 nm) of each of the films was separately measured in the same manner as described above to obtain the value of Rth (550) after storage. The separation measurement of the optical property was performed by using Axoscan (produced by Axometrics, Inc.). Moreover, the storage in the dry environment at 80° C. (relative humidity of 10% or less) was performed by using an air-blasting constant temperature incubator DN64 (produced by Yamato Scientific Co., Ltd.). Using two samples of the polarizing plate, a values were calculated according to the formula shown below, respectively, and the average thereof was taken as the a value of each of the films of the examples and the comparative examples. The evaluation was conducted according to the criteria shown below. When the evaluation result of the change amount shown below is ranked 1 or 2, it is able to be judged that there is no problem in practical use.

(Evaluation Criteria of Optical Property Change Amount a After High Temperature and Low Humidity Storage)

α=[Rth (550) after storage−initial Rth (550)]/initial Rth (550)

1: α was 0.10 or less
2: α was more than 0.10 and not more than 0.20
3: α was more than 0.20

<<Optical Property Change Amount β After High Temperature and High Humidity Storage>>

Each of the polarizing plates of the examples and the comparative examples was subjected to humidity conditioning in an environment at 25° C. and relative humidity of 60% for 24 hours and the optical property (initial Rth) was measured at 550 nm by using Axoscan (produced by Axometrics, Inc.) in an environment at 25° C. and relative humidity of 60%. Subsequently, each of the polarizing plates of Examples 1 to 19 and Comparative Examples 1 to 4 was stored in an environment at 85° C. and relative humidity of 85% for 1,000 hours, and each of the polarizing plates of Example 20 and Comparative Example 5 was stored in an environment at 90° C. and relative humidity of 90% for 1,000 hours, and after each of the samples stored was again subjected to humidity conditioning in an environment at 25° C. and relative humidity of 60% for 24 hours, the optical property (Rth after high temperature and high humidity storage) was measured in an environment at 25° C. and relative humidity of 60%. From these measurement results, the β value was calculated according to the formula shown below. In the same manner as described above, Rth (wavelength 550 nm) of each of the polarizing plate protective films of the examples and the comparative examples was separately measured. When the optical property change amount β after high temperature and high humidity storage shown below is ranked 1 to 3, it is able to be judged that there is no problem in practical use.

(Evaluation Criteria of Optical Property Change Amount β After High Temperature and High Humidity Storage)

β=(Rth after high temperature and high humidity storage)−(initial Rth)

1: β was 10 nm or less
2: β was more than 10 and not more than 25
3: β was more than 25 and not more than 50
4: β was more than 50

<<Change of Polarization Degree ΔTc after High Temperature and High Humidity Storage>>

With respect to the polarizing plate of each of the examples and the comparative examples, an orthogonal transmittance Tc (730) of the polarizer at a wavelength of 730 nm was measured according to the method shown below.

The orthogonal transmittance Tc (730) of the polarizing plate was measured by using an automatic polarizing film measuring device VAP-7070 produced by JASCO Corp. at a wavelength of 730 nm according to the method shown below.

In general, the orthogonal transmittance can be measured by two kinds of measuring methods:
(A) Measuring method wherein using two sheets of the polarizing plates, the absorption axes of the polarizers are disposed orthogonally to each other, thereby performing the measurement
(B) Measuring method wherein using one sheet of the polarizing plate, the absorption axis of the polarizer of the polarizing plate is disposed orthogonally to the absorption axis of Glan-Taylor prism attached to the device, thereby performing the measurement Here, of the measuring methods (A) and (B) described above, the measuring method (B) was adopted.

Two samples (5 cm×5 cm) in which the polarizing plate was stuck on a glass through a cohesive agent were prepared. In the stretching, the film of each of the examples and the comparative examples produced as above was stuck in such a manner that it faced the side of the glass. After subjecting to humidity conditioning in an environment at 25° C. and relative humidity of 60% for 24 hours, the orthogonal transmittance was measured by setting the glass side of the sample so as to face a light source. The two samples were measured respectively, and the average value thereof was taken as the orthogonal transmittance.

Subsequently, the two samples were stored in an environment at 85° C. and relative humidity of 85% for 72 hours and further subjected to humidity conditioning in an environment at 25° C. and relative humidity of 60% for 24 hours, and the orthogonal transmittance was measured. In the same manner as described above. The change amount ΔTc of the orthogonal transmittance between before and after the storage was determined, evaluated according to the criteria described below, and was designated as the change of polarization degree after high temperature and high humidity storage (durability of polarizer). When the evaluation result of the change of polarization degree shown below is ranked 1 to 3, it is able to be judged that there is no problem it practical use.

(Evaluation Criteria of Change of Polarization Degree After High Temperature and High Humidity Storage)
1: Change of orthogonal transmittance at a wavelength of 730 nm was less than 0.3%
2: Change of orthogonal transmittance at a wavelength of 730 nm was 0.3% or more and less than 0.5%
3: Change of orthogonal transmitance ata wavelength of 730 nm was 0.5% or more and less than 1.0%
4: Change of orthogonal transmitance at a wavelength of 730 nm was 1.0% or more In Table 4 below, the unit of the addition amount of the additive is represented by parts by weight with respect to 100 parts by weight of cellulose acylate contained in each layer.

TABLE 4

| | Core Layer | | | | Skin Layer | | | | Total | Layer Thickness |
| --- | --- | --- | --- | --- | --- | --- | --- | --- | --- | --- |
| | Cellulose Acylate of Core Layer | Additive 1: Addition Amount | Additive 2: Addition Amount | Additive 3: Addition Amount | Cellulose Acylate of Skin Layer | Additive 1: Addition Amount | Stretching Temperature (° C.) | Stretching Ratio (%) | Thickness of Film (μm) | of Skin Layer (μm) |
| Example 1 | Cellulose Acylate 1 | — | — | Gen1: 0.2 | Cellulose Acylate 2 | — | 200 | 35 | 45 | 1.1 |
| Example 2 | Cellulose Acylate 1 | — | — | Gen2: 0.2 | Cellulose Acylate 2 | — | 200 | 35 | 45 | 1.1 |
| Example 3 | Cellulose Acylate 1 | — | — | Gen3: 0.2 | Cellulose Acylate 2 | — | 200 | 35 | 45 | 1.1 |
| Example 4 | Cellulose Acylate 1 | — | — | Gen4: 0.2 | Cellulose Acylate 2 | — | 200 | 35 | 45 | 1.1 |
| Example 5 | Cellulose Acylate 1 | — | — | Gen5: 0.2 | Cellulose Acylate 2 | — | 200 | 35 | 45 | 1.1 |
| Example 6 | Cellulose Acylate 1 | — | — | Gen6: 0.2 | Cellulose Acylate 2 | — | 200 | 35 | 45 | 1.1 |
| Example 7 | Cellulose Acylate 1 | — | — | Gen7: 0.2 | Cellulose Acylate 2 | — | 200 | 35 | 45 | 1.1 |
| Example 8 | Cellulose Acylate 1 | — | — | Gen7: 0.2 | — | — | 200 | 35 | 42 | — |
| Example 9 | Cellulose Acylate 1 | Oligomer 1: 4 | P15: 2.3 | Gen1: 0.2 | Cellulose Acylate 2 | — | 186 | 31 | 40 | 1.1 |
| Example 10 | Cellulose Acylate 1 | Oligomer 1: 4 | P15: 2.3 | Gen2: 0.2 | Cellulose Acylate 2 | — | 185 | 30 | 40 | 1.1 |
| Example 11 | Cellulose Acylate 1 | Oligomer 1: 4 | P15: 2.3 | Gen2: 0.5 | Cellulose Acylate 2 | — | 185 | 30 | 40 | 1.1 |
| Example 12 | Cellulose Acylate 1 | Oligomer 1: 4 | P15: 2.3 | Gen2: 1 | Cellulose Acylate 2 | — | 185 | 30 | 40 | 1.1 |
| Example 13 | Cellulose Acylate 1 | Oligomer 1: 4 | P15: 2.3 | Gen3: 0.2 | Cellulose Acylate 2 | — | 188 | 29 | 40 | 1.1 |
| Example 14 | Cellulose Acylate 1 | Oligomer 1: 4 | P15: 2.3 | Gen4: 0.2 | Cellulose Acylate 2 | — | 190 | 27 | 40 | 1.1 |
| Comparative Example 1 | Cellulose Acylate 1 | Oligomer 1: 4 | P15: 2.3 | Comparative Compound 1: 0.2 | Cellulose Acylate 2 | — | 187 | 30 | 40 | 1.1 |

TABLE 4-continued

| | Core Layer | | | | Skin Layer | | Stretching Temperature (° C.) | Stretching Ratio (%) | Total Thickness of Film (μm) | Layer Thickness of Skin Layer (μm) |
|---|---|---|---|---|---|---|---|---|---|---|
| | Cellulose Acylate of Core Layer | Additive 1: Addition Amount | Additive 2: Addition Amount | Additive 3: Addition Amount | Cellulose Acylate of Skin Layer | Additive 1: Addition Amount | | | | |
| Example 15 | Cellulose Acylate 1 | Oligomer 2: 19 | — | Gen1: 0.2 | Cellulose Acylate 2 | Oligomer 2: 11 | 175 | 30 | 60 | 1.5 |
| Example 16 | Cellulose Acylate 3 | — | P15: 10 | Gen3: 1 | Cellulose Acylate 2 | — | 195 | 19 | 25 | 1.1 |
| Example 17 | Cellulose Acylate 4 | Oligomer 4: 1.5 | S1: 7.5 | Gen4: 0.2 | — | — | 165 | 30 | 40 | — |
| Comparative Example 2 | Cellulose Acylate 1 | Oligomer 1: 4 | P15: 2.3 | — | Cellulose Acylate 2 | — | 185 | 30 | 40 | 1.1 |
| Comparative Example 3 | Cellulose Acylate 1 | Oligomer 1: 4 | P15: 2.3 | — | Cellulose Acylate 2 | — | 189 | 31 | 40 | 1.1 |
| Comparative Example 4 | Cellulose Acylate 1 | Oligomer 2: 19 | — | — | Cellulose Acylate 2 | Oligomer 2: 11 | 173 | 32 | 57 | 1.5 |
| Example 18 | Cellulose Acylate 5 | Oligomer 3: 15 | — | Gen3: 0.2 | — | — | No Heat Stretching | | 40 | — |
| Example 19 | Cellulose Acylate 1 | Oligomer 2: 19 | L: 5 | Gen3: 0.2 | Cellulose Acylate 2 | Oligomer 2: 11 | 190 | 70 | 40 | 1.1 |

TABLE 5

| | Re (nm) | Rth (nm) | Peeling-off Property from Band | Viscosity Change Ratio after High Temperature and High Humidity Storage | Optical Property Change Amount β after High Temperature and High Humidity Storage | Change of Polarization Degree after High Temperature and High Humidity Storage ΔTc (730 nm) |
|---|---|---|---|---|---|---|
| Example 1 | 50 | 120 | 1 | 2 | 2 | 1 |
| Example 2 | 50 | 120 | 1 | 2 | 2 | 1 |
| Example 3 | 50 | 120 | 1 | 2 | 2 | 1 |
| Example 4 | 50 | 120 | 1 | 2 | 2 | 1 |
| Example 5 | 50 | 120 | 1 | 3 | 3 | 1 |
| Example 6 | 50 | 120 | 1 | 2 | 2 | 1 |
| Example 7 | 50 | 120 | 1 | 3 | 3 | 1 |
| Example 8 | 50 | 120 | 3 | 3 | 3 | 1 |
| Example 9 | 50 | 120 | 1 | 2 | 2 | 1 |
| Example 10 | 50 | 120 | 1 | 2 | 2 | 1 |
| Example 11 | 50 | 120 | 1 | 1 | 1 | 2 |
| Example 12 | 50 | 120 | 1 | 1 | 1 | 3 |
| Example 13 | 50 | 120 | 1 | 2 | 2 | 1 |
| Example 14 | 50 | 120 | 1 | 2 | 2 | 1 |
| Comparative Example 1 | 50 | 120 | 1 | 2 | 2 | 4 |
| Example 15 | 50 | 120 | 1 | 3 | 3 | 2 |
| Example 16 | 50 | 120 | 1 | 2 | 2 | 3 |
| Example 17 | 50 | 120 | 2 | 2 | 2 | 1 |
| Comparative Example 2 | 50 | 120 | 1 | 4 | 4 | 1 |
| Comparative Example 3 | 50 | 120 | 1 | 4 | 4 | 1 |
| Comparative Example 4 | 50 | 120 | 1 | 4 | 4 | 1 |
| Example 18 | 0 | 0 | 1 | 1 | 1 | 1 |
| Example 19 | 100* | −40* | 1 | 2 | 2 | 1 |
| Example 20 | 0 | 0 | 1 | 1 | 1 | 1 |
| Comparative Example 5 | 0 | 0 | 1 | 4 | 4 | 1 |

*Optical property after coating the retardation layer.

TABLE 6

| | Optical Property Change Amount α after High Temperature and Low Humidity Storage |
|---|---|
| Example 9 | 2 |
| Example 10 | 2 |
| Example 11 | 2 |
| Example 12 | 2 |
| Example 13 | 2 |
| Example 14 | 2 |

TABLE 6-continued

Optical Property Change Amount α after High
Temperature and Low Humidity Storage

| | |
|---|---|
| Comparative Example 1 | 2 |
| Example 15 | 3 |
| Example 16 | 1 |
| Comparative Example 4 | 3 |

From the results shown above, it is apparent that since the polarizing plate protective films and the polarizing plates using the same of the examples can suppress the hydrolysis of the polymer, not only the degradation of optical properties of the film can be prevented, but also when the polarizing plate is produced, the deterioration of the polarization degree can be suppressed.

What is claimed is:

1. A polarizing plate protective film comprising a polymer having at least one of an ester bond and an amide bond, and a compound which generates a base by an action of an acid, the compound being at least one selected from a group consisting of:
an oxime compound;
wherein the oxime compound is represented by formula (2)

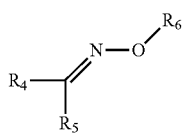

Formula (2)

in formula (2), $R_4$ and $R_5$ each independently represents an alkyl group,
$R_6$ represents a hydrogen atom, an alkyl group, an aryl group, an acyl group or a group represented by formula (N1),
$R_4$ and $R_5$ may be combined with each other to form a ring,

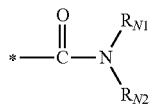

Formula (N1)

in formula ($N_1$), $R_{N1}$ and $R_{N2}$ each independently represents a hydrogen atom, an alkyl group or an aryl group,
* represents a bond connecting to the oxygen atom, and $R_{N1}$ and $R_{N2}$ may be combined with each other to form a ring,
a hydrazone compound; and
a compound represented by formula (1);

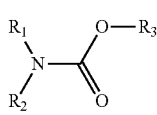

Formula (1)

wherein, in the formula (1),
$R_1$ and $R_2$ each independently represents an alkyl group, and $R_1$ and $R_2$ and combined with each other to form a ring, and
$R_3$ represents an alkyl group or an aryl group, wherein the hydrazone compound is represented by formula (3);

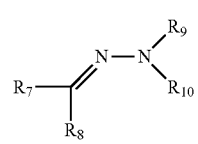

Formula (3)

wherein the formula (3),
$R_7$ and $R_8$ each independently represents an alkyl group,
$R_9$ and $R_{10}$ each independently represents a hydrogen atom, an alkyl group or an aryl group, wherein the aryl group has an aromatic ring which is not directly bonded to N, provided that at least one of $R_9$ or $R_{10}$ represents an alkyl group or an aryl group, wherein the aryl group has an aromatic ring which is not directly bonded to N,
$R_7$ and $R_8$ may be combined with each other to form a ring having from 5 to 7 carbon atoms, and $R_9$ and $R_{10}$ may be combined with each other to form a ring having from 5 to 7 carbon atoms,
$R_7$ to $R_{10}$ and the ring formed therefrom may have a substituent which is selected from the group consisting of an alkyl group, an aryl group, a hydroxyl group, an acyl group, an alkyl ether group, an aminocarbonyl group, an imino group represented by $-N=CR_{21}R_{22}$ in which $R_{21}$ and $R_{22}$ each independently represents an alkyl group or an aryl group, and a group formed by combining two or more thereof,
wherein a content of the compound is 0.01 parts by weight and less than 2 parts by weight, with respect to 100 parts by weight of the polymer having the at least one of an ester bond and an amide bond, a pKa of the base's conjugated acid is less than 4, and a maximum value of energy absorption of the compound is a wavelength of less than 300 nm,
wherein the at least one of an ester bond and an amide bond of the polymer, is susceptible to hydrolysis at high temperature and high humidity environment to generate the acid, and
wherein the polymer is at least one selected from a (meth)acrylic resin and a cellulose acylate.

2. The polarizing plate protective film as claimed in claim 1, wherein the polymer is cellulose acylate.

3. The polarizing plate protective film as claimed in claim 2, wherein an acyl substitution degree of the cellulose acylate is from 1.8 to 3.0.

4. The polarizing plate protective film as claimed in claim 1, which further comprises a compound represented by the following formula (4):

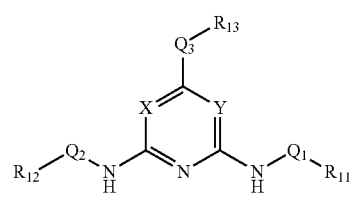

Formula (4)

wherein, in the formula (4), X and Y each independently represents —N— or —CH—, $Q_1$, $Q_2$ and $Q_3$ each independently represents a single bond or a divalent connecting group, and $R_{11}$, $R_{12}$ and $R_{13}$ each independently represents a hydrogen atom, an alkyl group, an alkenyl group, an alkynyl group, an aryl group, a cyano group a halogen atom or a heterocyclic group.

5. The polarizing plate protective film as claimed in claim 1, wherein at temperature of 25° C. and relative humidity of 60%, a retardation value in an in-plane direction at a wavelength of 550 nm is from −20 to 120 nm and a retardation value in a thickness direction at a wavelength of 550 nm is from −70 to 300 nm.

6. The polarizing plate protective film as claimed in claim 1, wherein at temperature of 25° C. and relative humidity of 60%, a retardation value in an in-plane direction at a wavelength of 550 nm is from 20 to 80 nm and a retardation value in a thickness direction at a wavelength of 550 nm is from 80 to 300 nm.

7. A polarizing plate comprising the polarizing plate protective film as claimed in claim 1 and a polarizer.

8. A liquid crystal display device comprising a liquid crystal cell and the polarizing plate as claimed in claim 7.

9. The liquid crystal display device as claimed in claim 8, wherein a display system is a VA system or an IPS system.

10. A production method of a polarizing plate protective film comprising: producing the polarizing plate protective film of claim 1 with a composition containing the polymer having the at least one of an ester bond and an amide bond and the compound which generates the base by an action of the acid.

11. A production method of a polarizing plate protective film having a core layer and a skin layer, which comprises producing the polarizing protective film of claim 1 by: co-casting a dope for forming a core layer containing the cellulose acylate and a dope for forming a skin layer containing the cellulose acylate, wherein at least one of the dope for forming a core layer and the dope for forming a skin layer contains the compound which generates the base by an action of the acid.

* * * * *